United States Patent
Vander Lind et al.

(10) Patent No.: US 11,442,474 B2
(45) Date of Patent: *Sep. 13, 2022

(54) ADJUSTING LOAD ON TETHERED AIRCRAFT

(71) Applicant: Kitty Hawk Corporation, Palo Alto, CA (US)

(72) Inventors: Damon Vander Lind, Alameda, CA (US); Gregory Mainland Horn, Mountain View, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 155 days.

This patent is subject to a terminal disclaimer.

(21) Appl. No.: 16/913,250

(22) Filed: Jun. 26, 2020

(65) Prior Publication Data

US 2021/0080979 A1 Mar. 18, 2021

Related U.S. Application Data

(63) Continuation of application No. 15/221,444, filed on Jul. 27, 2016, now Pat. No. 10,747,237.

(51) Int. Cl.
| | | |
|---|---|---|
| *G05D 1/10* | (2006.01) | |
| *B64D 47/08* | (2006.01) | |
| *B64C 13/16* | (2006.01) | |
| *B64D 1/22* | (2006.01) | |
| *B64C 39/02* | (2006.01) | |
| *B64D 31/06* | (2006.01) | |

(52) U.S. Cl.
CPC ............ *G05D 1/104* (2013.01); *B64C 13/16* (2013.01); *B64C 39/024* (2013.01); *B64D 1/22* (2013.01); *B64D 31/06* (2013.01); *B64D 47/08* (2013.01); *B64C 2201/128* (2013.01); *B64C 2201/143* (2013.01)

(58) Field of Classification Search
CPC ............. B64C 13/16; B64C 2201/128; B64C 2201/143; B64D 1/22; B64D 31/06; B64D 47/08; G05D 1/104
See application file for complete search history.

(56) References Cited

U.S. PATENT DOCUMENTS

| | | | |
|---|---|---|---|
| 2,298,912 A | 10/1942 | Alabrune | |
| 4,416,436 A | 11/1983 | Wilson, Jr. | |
| 5,722,618 A | 3/1998 | Jacobs | |
| 8,308,142 B1 * | 11/2012 | Olson | B64D 3/00 258/1.4 |
| 8,781,719 B1 | 7/2014 | Bernhardt | |
| 2009/0299551 A1 * | 12/2009 | So | B64C 39/024 701/3 |
| 2016/0318609 A1 * | 11/2016 | Lynn | B64C 3/16 |

* cited by examiner

*Primary Examiner* — Anshul Sood
(74) *Attorney, Agent, or Firm* — Van Pelt, Yi & James LLP

(57) ABSTRACT

A system for adjusting a load on a tethered aircraft is disclosed. The aircraft is tethered to a payload. The system determines a new position for the tethered aircraft in the event that due to environmental effects, e.g., the aircraft is flying upwind or downwind, the load experienced by the tethered aircraft is not optimal.

21 Claims, 19 Drawing Sheets

Phase Adjustment Diagram

Load Adjustment Diagram

ADJUSTING LOAD ON TETHERED AIRCRAFT

CROSS REFERENCE TO OTHER APPLICATIONS

This application is a continuation of U.S. patent application Ser. No. 15/221,444 entitled ADJUSTING LOAD ON TETHERED AIRCRAFT filed Jul. 27, 2016 which is incorporated herein by reference for all purposes.

BACKGROUND OF THE INVENTION

Aircraft have been used to lift payloads. In some cases, multiple aircraft may be used to lift a payload. Each lifting aircraft may be tethered to the payload. An aircraft with a payload tethered to it experiences a load (force) due to the payload tethered to the aircraft. A battery or other power source of the aircraft may be desired to be conserved. Due to wind, the position or trajectory of the aircraft may not be optimal, causing the tethered aircraft to consume greater battery power than desired.

BRIEF DESCRIPTION OF THE DRAWINGS

Various embodiments of the invention are disclosed in the following detailed description and the accompanying drawings.

DETAILED DESCRIPTION

Figure 1:
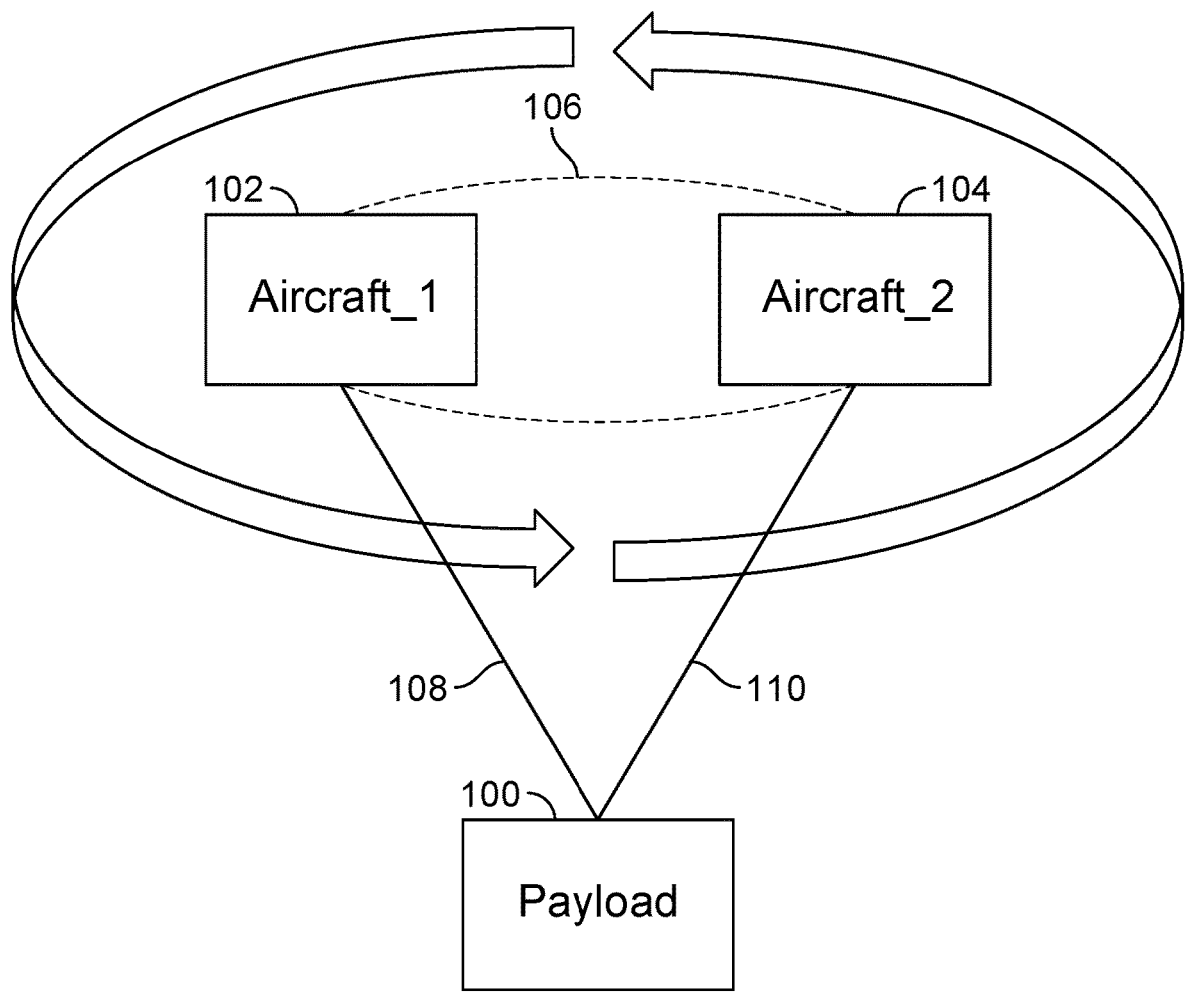
FIG. 1 is a diagram illustrating an embodiment of a load adjustment system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system to adjust a load on an aircraft is disclosed. The system comprises an interface to receive wind information associated with a first aircraft. The system further comprises a processor configured to determine based at least in part on the wind information whether a first aircraft included in a plurality of aircraft tethered to a payload and flying initially in an original elliptical trajectory is flying upwind or downwind. In the event the first aircraft is determined to be flying downwind, the processor is configured to cause the first aircraft to fly further from a vertical axis of the payload than a corresponding distance associated with the original elliptical trajectory. In the event the first aircraft is determined to be flying upwind, the processor is configured to cause the first aircraft to fly nearer to a vertical axis of the payload than a corresponding distance associated with the original elliptical trajectory. In some embodiments, the plurality of aircraft are in the process of lifting the payload.

In some embodiments, a primary or first aircraft and a reference or second aircraft are tethered to a payload. The first aircraft and second aircraft may lift the payload by flying in a periodic trajectory above the payload. The aircraft may circle the payload while flying at an incline, lifting the payload. More than two aircraft may be used. Multiple aircraft lifting the payload may not experience the same lift. For example, a first aircraft flying upwind experiences greater lift than a second aircraft flying downwind. In the optimal load distribution, an aircraft experiencing greater lift shoulders a greater load than an aircraft experiencing less lift. The optimal load distribution may result in saved battery power of the aircraft. An optimal load distribution may be such that multiple aircraft lifting the payload experience varying loads. In some embodiments, an aircraft changes its trajectory based on whether it is flying upwind or downwind. An aircraft may decrease the radius of its elliptical trajectory in the event the aircraft is flying upwind and increase the radius of its elliptical trajectory in the event the first aircraft is flying downwind. In some embodiments, a second aircraft or multiple other aircraft determine a complementary new trajectory and fly to the complementary new trajectory. The multiple aircraft may share the same new periodic trajectory. The new trajectory may be a translation of the original periodic trajectory in three-dimensional space or a tilted version of the original periodic trajectory.

In some embodiments, the system for load adjustment while the aircraft are lifting the payload is coupled with a system for maintaining a phase difference. In some embodiments, the aircraft and payload transition to a forward flight configuration after lifting the payload a target distance from the ground. The aircraft may adjust their trajectory based on one or more of the following: phase maintenance, load adjustment, power efficiency, or any other appropriate factor.

FIG. 1 is a diagram illustrating an embodiment of a system to maintain a target phase difference. In the example shown, aircraft_1 102 and aircraft_2 104 fly in a shared periodic trajectory 106 above payload 100. Aircraft_1 102 is connected to payload 100 via tether 108. Aircraft_2 104 is connected to payload 100 via tether 110. In some embodiments, tether 108 and tether 110 are powered. In some embodiments, payload 100 is powered. Payload 100 may deliver power to aircraft_1 102 and aircraft_2 104 via tether 108 and tether 110, wherein tether 108 and tether 110 conduct electricity. Payload 100 may use power to actively engage in forward flight after it is lifted. In various embodiments, periodic trajectory 106 comprises a circular trajectory or an elliptical trajectory. In some embodiments, tethers are attached to the payload itself and the payload spins as it is lifted. In some embodiments, the tethers are attached to a device surrounding the payload such as a ring, such that the device spins around the payload.

In some embodiments, aircraft_1 102 and aircraft_2 104 are launched into the air using a catapult. In some embodiments, lift rotors or other structures may be used to launch the aircraft. In some embodiments, aircraft_1 102 is launched first and begins flying in trajectory 106, and aircraft_2 104 is subsequently launched and flies in trajectory 106 at a set phase difference from aircraft_1 102. In various embodiments, techniques disclosed herein are used to ensure the aircraft_2 104 flies in trajectory 106 at a set phase difference from aircraft_1 102. In some embodiments, aircraft_1 102 and aircraft_2 104 are initially launched to an altitude lower than the altitude of trajectory 106. In some embodiments, the aircraft fly in a periodic trajectory while increasing altitude until they fly in periodic trajectory 106. In some embodiments, tethers 108 and 110 spiral, suspended in the air, as aircraft_1 102 and aircraft_2 reach a desired altitude. Aircraft_1 102 and aircraft_2 104 may be optimized for forward flight and cruising. The aircraft may be inefficient at pure vertical flight. In some embodiments, aircraft_1 102 and aircraft_2 104 are launched in order to save battery power. Battery power may be conserved because the aircraft are launched by an external force instead of taking off using battery power. In some embodiments, aircraft_1 102 and aircraft_2 104 have hover capability and hover to the desired altitude before flying in periodic trajectory 106. Aircraft_1 102 and aircraft_2 104 may launch horizontally. In some embodiments, aircraft_1 102 is tethered to aircraft_2 104, and the aircraft pick up payload 100 via a hook after the aircraft are airborne.

Figure 2:
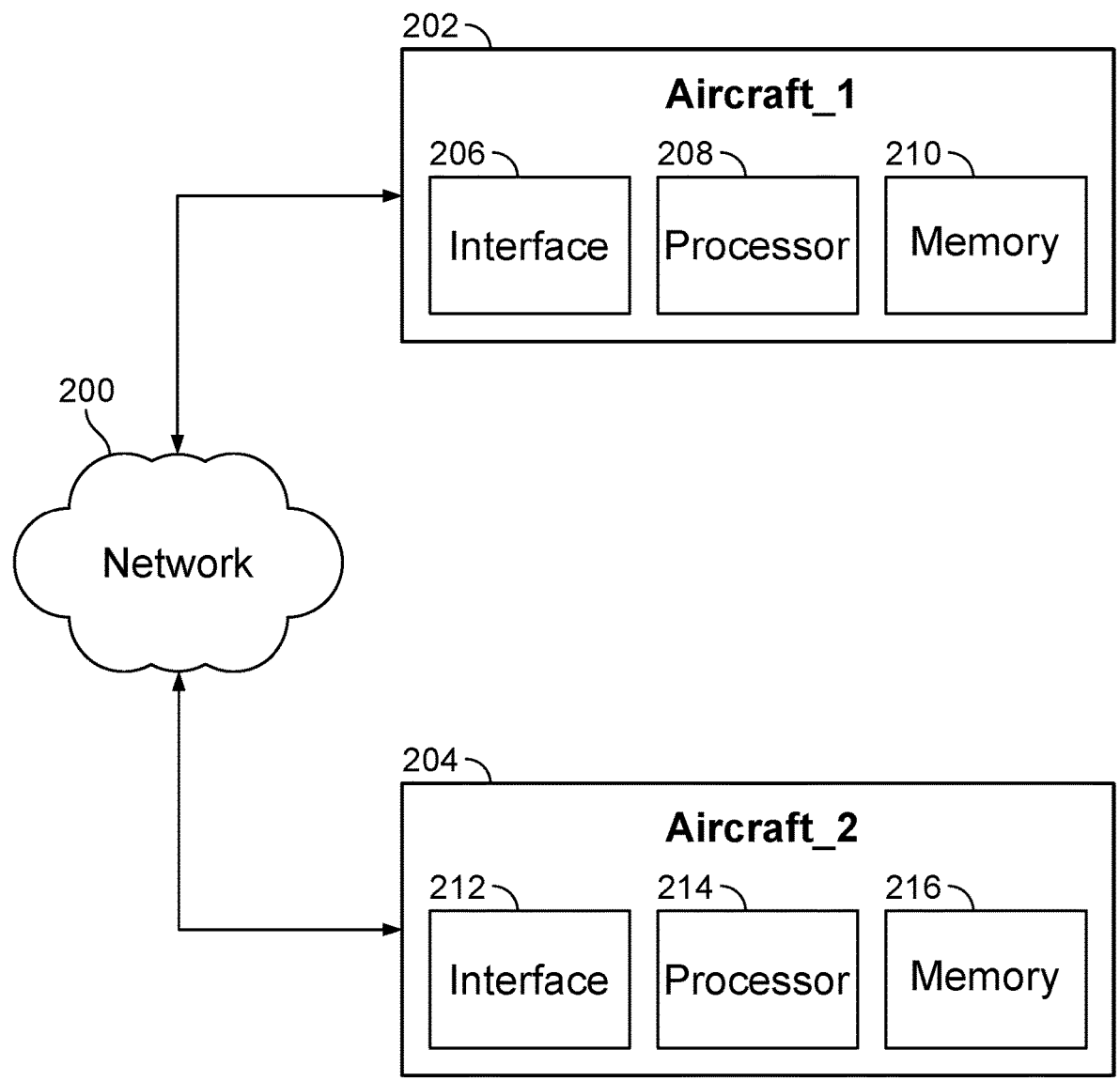
FIG. 2 is a block diagram illustrating an embodiment of a load adjustment system.

FIG. 2 is a block diagram illustrating an embodiment of a system to maintain a target phase difference. In some embodiments, aircraft_1 202 is implemented by aircraft_1 102 of FIG. 1. In some embodiments, aircraft_2 204 is implemented by aircraft_2 104 of FIG. 1. In the example shown, aircraft_1 202 comprises interface 206, processor 208, and memory 210. In the example shown, aircraft_2 204 comprises interface 212, processor 214, and memory 216. In the example shown, aircraft_1 202 and aircraft_2 204 communicate via network 200. In some embodiments, additional aircraft or the payload are in communication with aircraft_1 202 and aircraft_2 204 via network 200. In various embodiments, network 200 comprises one or more of the following: Wi-Fi, Ethernet radio, very high frequency (VHF) radio, a wireless network, the Internet, or any other appropriate communication network. In various embodiments, network 200 comprises one or multiple of any number of lower level networks, including 2.4 gHz or 900 mHz ethernet radios, zygbee radios, and any other radio able to provide communications. The communication may be performed using a range of protocols including Transmission Control Protocol/Internet Protocol (TCP/IP) and/or User Datagram Protocol (UDP). In some embodiments, UDP or other non-retransmitting protocols are used.

In some embodiments, aircraft_1 202 and aircraft_2 204 communicate their positions to each other in order to determine the phase difference between them. For example, the aircraft communicate whether they are ahead or behind of a target position. In some embodiments, the target position for aircraft_1 202 comprises a position directly opposite aircraft_2 204 on the periodic trajectory they are flying in. In some embodiments, multiple aircraft are spaced out equally on the periodic trajectory. The aircraft may be spaced out equally in timing on the periodic trajectory. For example, aircraft may be facing different wind based on their orientation. In some embodiments, aircraft_1 202 and aircraft_2 204 adjust their trajectories simultaneously in response to a detected variance in phase difference from the target phase difference. For example, in lieu of one aircraft making an adjustment while the other aircraft continues its original trajectory, both aircraft make smaller complementary adjustments. In some embodiments, the aircraft are in communication. In some embodiments, communication is not required.

In some embodiments, aircraft_1 202 is the primary lift aircraft and aircraft_2 204 is the reference lift aircraft. The primary lift aircraft maintains a target phase difference from the reference lift aircraft by adjusting its trajectory, while the reference lift aircraft does not adjust its trajectory. The reference aircraft does not require telemetry information regarding the primary aircraft. In some embodiments, the reference aircraft institutes the same target phase adjustment system as the primary lift aircraft and adjusts its trajectory complementarily.

In some embodiments, aircraft_1 202 and aircraft_2 204 communicate wind information to each other. For example, aircraft_1 202 communicates whether it is flying against wind, a direction of the wind, or a speed of the wind. In some embodiments, aircraft_1 202 and aircraft_2 204 communicate a lift information to each other, such as a calculated lift coefficient, climb rate, or tether load.

Aircraft_1 202 may communicate its lift information to aircraft_2 204 based on the wind aircraft_1 202 is experiencing. An aircraft that flies upwind or against the direction of the wind sees a higher dynamic pressure and thus will generate a higher lift than the one which is flying downwind. A load adjustment system may change aircraft trajectories based on wind to optimize the lift capacity of the multiple aircraft. While it is advantageous to make use of the extra lift generated on the upwind vehicle, it is problematic to balance forces between the upwind and downwind aircraft given the decreased dynamic pressure on the downwind vehicle. To solve this or as an outcome of the phase control applied herein, the upwind vehicle may in essence fly a tighter circle at a lower flight speed and at a higher altitude, with greater tether force, while the downwind flight vehicle flies a wider circle at a higher flight speed and a lower altitude.

Taking advantage of the lift generated by wind by increasing the load on the upwind aircraft may save battery power of the aircraft. In some embodiments, flying multiple aircraft at the same altitude is inefficient and drains battery power. A load may be increased on an upwind aircraft by flying the aircraft closer to the vertical axis of the payload. Flying the first aircraft closer to the vertical axis of the payload and at a higher altitude than the other aircraft may increase the proportion of load from the payload that the first aircraft experiences in comparison to the other aircraft. In the case that the tether is taut, flying closer to the vertical axis of the payload may bring the aircraft to a position of increased altitude. In some embodiments, the aircraft both adjust positions or trajectories in order to experience an optimal load. For example, one aircraft may fly towards the vertical axis of the payload while the other flies away from the vertical axis of the payload, or one aircraft may fly at an increased altitude while the other flies at a decreased altitude. The aircraft may originally fly in a periodic trajectory and adjusting their trajectories results in flying in a tilted translation of the original periodic trajectory. The side of the trajectory wherein the aircraft fly upwind may be at a higher altitude than the side of the trajectory wherein the aircraft fly with the wind. In some embodiments, the aircraft adjust positions or trajectories based on information indicating whether the aircraft are flying upwind or downwind.

In response to wind, in some embodiments the primary aircraft may readjust a load it experiences by adjusting the aircraft's position or trajectory, while the reference aircraft does not adjust its position or trajectory. In some embodiments, the primary aircraft moves to a new altitude. In some embodiments, a new position of the primary aircraft is the same distance from the payload as the original position. For example, the tether is kept taut. In other embodiments, all aircraft are flying with the same control laws and as such are simultaneously adjusting to one another.

In various embodiments, no communication or indirect communication exists between the aircraft. For example, an aircraft may utilize an apparent wind speed, a ground wind speed, a tether tension, or a tether angle to determine whether the aircraft should move closer to the vertical axis of the payload or further from it. For example, an aircraft that is flying against the wind will experience an increased tether tension due to increased lift in comparison to an aircraft that is flying with the wind. The aircraft may determine the wind direction based on its experienced tether tension. In some embodiments, the system uses predictive control in order to preemptively adjust the aircraft trajectories.

In some embodiments, aircraft_1 202 and aircraft_2 204 are in communication with an external processor. Aircraft_1 202 and aircraft_2 204 send telemetry information to the external processor, which determines trajectory information and sends the information to one or more of the aircraft. In some embodiments, the aircraft may relay wind or lift information to the external processor, which processes the information. The external processor returns trajectory or position information. In other embodiments, aircraft_1 202 and aircraft_2 204 are in direct communication with one another and exchange phase or other state information that then are utilized in their control laws. In various embodiments, the control laws for one vehicle are run on the other, one aircraft runs the control laws for both aircraft, or the control laws are executed completely by a third computer placed in the system.

In some embodiments, aircraft_1 202 and aircraft_2 204 are in communication in order to coordinate a transition between flight configurations. For example, as the aircraft and the payload transition from a lift configuration to a forward flight configuration, the aircraft and the payload communicate their state. State may be communicated in order to prevent collisions and coordinate the transition. In some embodiments, the aircraft and the payload transmit sensor information via the network. In some embodiments, in forward flight the lift aircraft may tow the payload behind them. The payload may be a winged flight vehicle capable of forward flight. In some embodiments, the payload aircraft tows the lift aircraft once fully transitioned to forward flight. The payload may use a cruise optimized propulsion system.

Figure 3A:
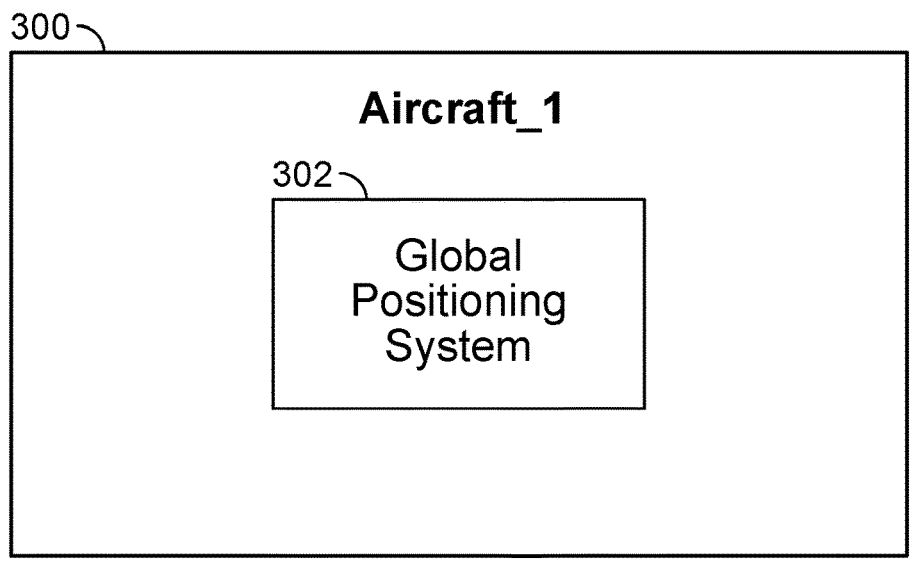
FIG. 3A is a block diagram illustrating an embodiment of an aircraft.

FIG. 3A is a block diagram illustrating an embodiment of an aircraft. Aircraft_1 300 comprises global positioning system (GPS) 302. In some embodiments, the phase difference between the primary aircraft and the reference aircraft is determined based at least in part on one or more of the following: a sensor data, a visual data, or a location data. In various embodiments, multiple aircraft or the payload comprises global positioning systems, sensors, or cameras. In various embodiments, the phase difference is determined through estimation from data collected from a range of sensors on one or both flight vehicles, possibly including GPS, inertial measurement unit (IMUs), cameras, radar, sonar, or other inertial or position sensing device. In some embodiments, global positioning system 302 provides location information on aircraft_1 300. In some embodiments, aircraft_1 300 relays its location to another aircraft tethered to the same payload. In some embodiments, multiple aircraft share their GPS location via a network in order to determine the phase difference between two aircraft. In some embodiments, the GPS location is shared to determine a relative load experienced by the aircraft. In some embodiments, the GPS location is shared to prevent collisions.

Figure 3B:
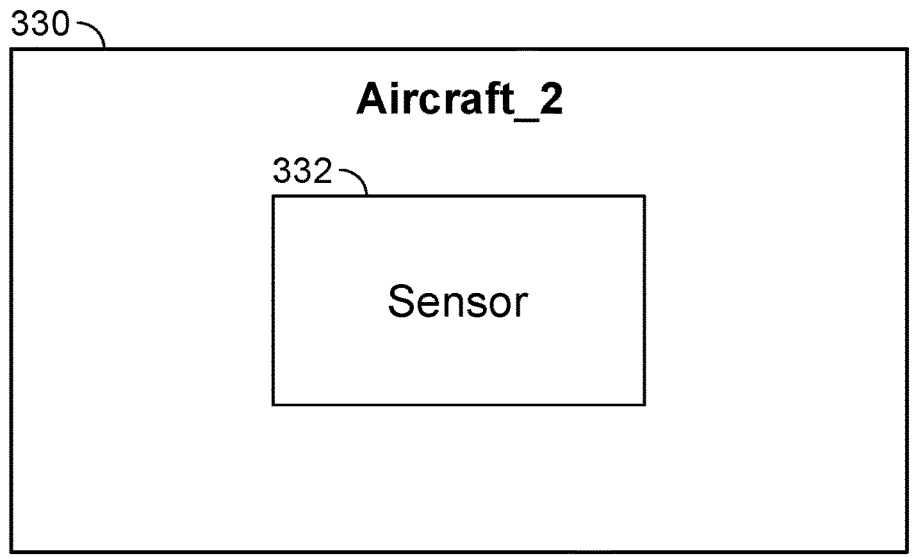
FIG. 3B is a block diagram illustrating an embodiment of an aircraft.

FIG. 3B is a block diagram illustrating an embodiment of an aircraft. Aircraft_2 330 comprises sensor 332. In various embodiments, sensor 332 comprises a ground reference sensor, a line angle sensor, a relative position sensor, or any appropriate sensor. In some embodiments, sensor 332 is used to determine a position of aircraft_2 relative to a payload or another aircraft. In some embodiments, the position information is used to calculate a phase difference between aircraft_2 and an aircraft recognized by the sensor or to calculate a relative load experienced by an aircraft. In some embodiments, the sensors are used to prevent collisions. In some embodiments, an image or position detected by the sensor triggers a step in the series of steps used to transition from a lift configuration to a forward flight configuration. For example, the detection of the first aircraft flying at a target distance ahead of the payload triggers the payload to engage forward flight at full speed. In some embodiments, the aircraft and the payload transition in the absence of direct communication with each other. The aircraft and the payload may run simultaneous controls and use sensors to coordinate their flight paths.

Figure 3C:
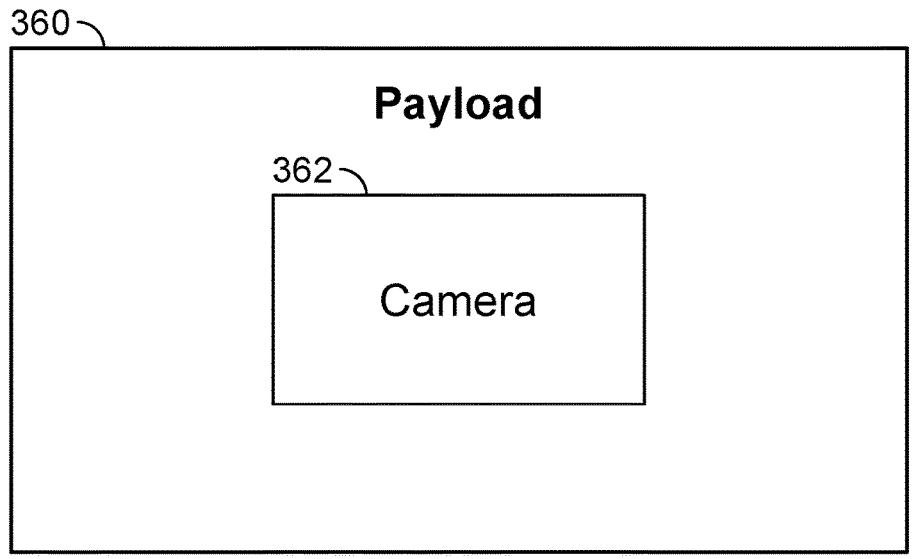
FIG. 3C is a block diagram illustrating an embodiment of a payload.

FIG. 3C is a block diagram illustrating an embodiment of a payload. Payload 360 comprises camera 362. In some embodiments, camera 362 is used to capture images of aircraft tethered to payload 360. In various embodiments, data captured by camera 362 may be used to determine a phase difference between two aircraft tethered to the payload, determine a lift information for an aircraft, or execute a flight configuration transition. In various embodiments, payload 360 comprises a line angle sensor, a radar, or any other relative position sensor.

Figure 4:
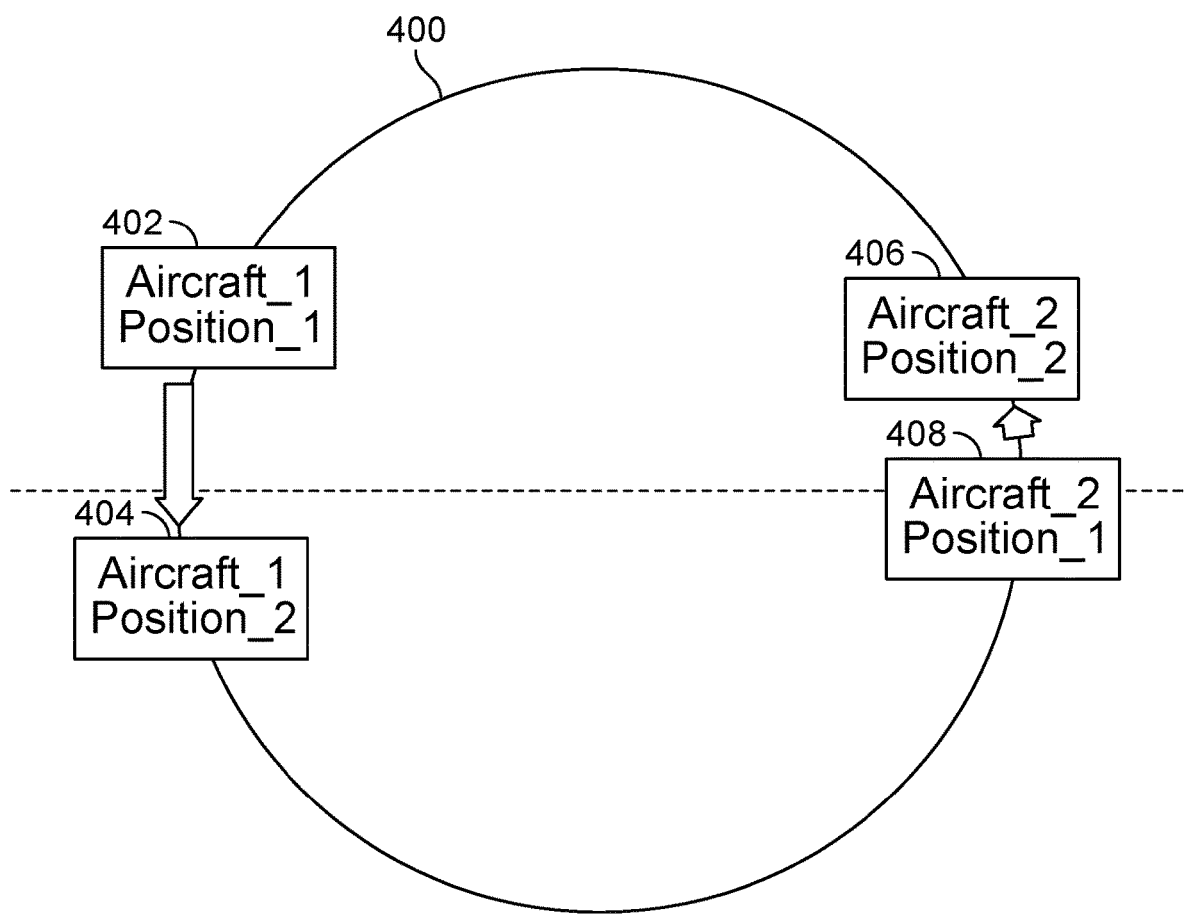
FIG. 4 is a diagram illustrating an embodiment of a system to maintain a target phase difference using throttle adjustment.

FIG. 4 is a diagram illustrating an embodiment of a system to maintain a target phase difference using throttle adjustment. In the example shown, aircraft_1 and aircraft_2 are flying in trajectory 400. The target phase difference for the aircraft in this example results in the aircraft flying directly opposite each other in circular trajectory 400, or near opposite in side winds. If more than two lift aircraft are used, a target phase difference that results in the aircraft being spaced substantially equally around the trajectory may be maintained, with slight target phase differences potentially entering at various points around the loop with higher side winds. In the event the multiple aircraft are flying at the same altitude, the phase difference may be maintained such that a load from the payload is equally distributed amongst the multiple aircraft. In some embodiments, the phase difference is maintained such that the payload is lifted in a stable position with minimal swinging. As shown in FIG. 4, the phase difference between aircraft_1 position_1 402 and aircraft_2 position_1 408 does not match the target phase difference. A target position for aircraft_1 according to the target phase difference is at the dotted line, directly opposite aircraft_2 position_1 408. As a result, aircraft_1 is determined to be behind its desired position relative to aircraft_2. Throttle is adjusted such that the aircraft reach the target phase difference. Increasing throttle causes the aircraft to fly faster and decreasing throttle causes the aircraft to fly slower. In the scenario shown in FIG. 4, a throttle of aircraft_1 may be increased relative to a throttle of aircraft_2 by an amount calculated to decrease the variance in phase difference from the target phase difference by enabling aircraft_1 to catch up to aircraft_2 along the trajectory and achieve a target position opposite aircraft_2. In various embodiments, the throttle of aircraft_1 may be changed, the throttle of aircraft_2 may be changed, or the throttle of both aircraft may be changed to maintain a spacing/phase between the two (or more) aircraft as they fly along the common trajectory. In the example shown in FIG. 4, the target phase difference has been attained by the time aircraft_1 is in aircraft_1 position_2 404 and aircraft_2 is in aircraft_2 position_2 406.

Throttle adjustment may consume a significant amount of power, notably in large, fast, or highly aerodynamic lifting aircraft or in comparison to steady state circling flight. In some embodiments, the aircraft are powered by a finite amount of battery power. In some embodiments, throttle adjustment is used as a supplemental or back-up phase adjustment technique. In some embodiments, using throttle adjustment as a sole phase adjustment technique requires twice the power as using a phase adjustment technique that does not involve adjusting throttle.

Figure 5:
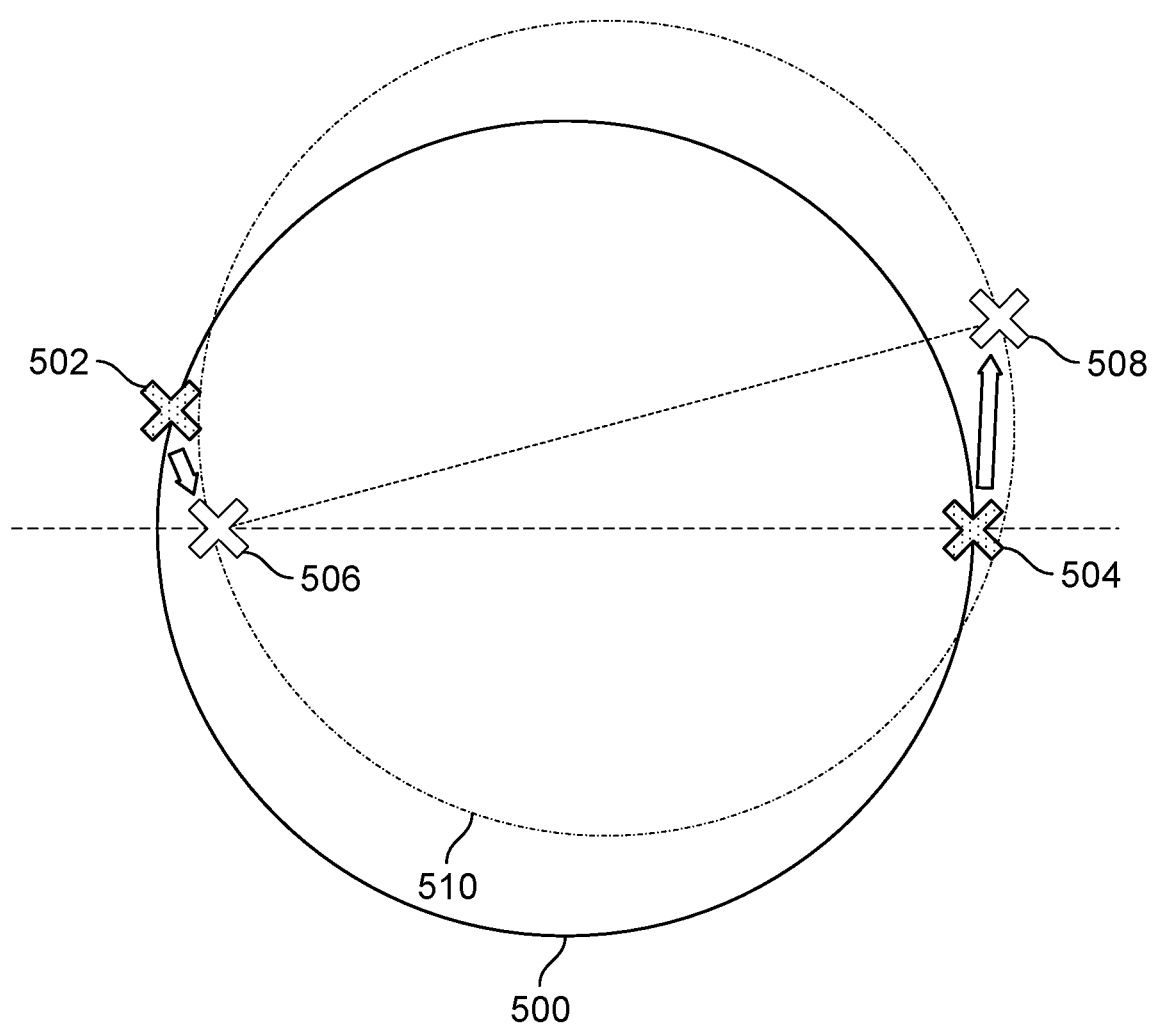
FIG. 5 is a diagram illustrating an embodiment of a system to maintain a target phase difference using trajectory adjustment.

FIG. 5 is a diagram illustrating an embodiment of a system to maintain a target phase difference using trajectory adjustment. In various embodiments, a target phase difference may be attained and/or maintained at least in part by computing and adjusting the flight of the respective lift aircraft to attain a target position along a new trajectory. In the example shown in FIG. 5, positions 502 and 504 are initial positions of the first and second aircraft, respectively, on circular trajectory 500. Positions 502 and 504 do not correspond to the target phase difference, as indicated by the dashed horizontal line through position 504. In various embodiments, course and/or throttle adjustments for one or both of the aircraft are computed and implemented to attain new positions 506 and 508 of the first and second aircraft, respectively, on a new trajectory 510. In some embodiments, an aircraft is determined to be ahead or behind of a target position based on the variance in phase difference. For example, in the example shown in FIG. 5, the aircraft in position 502 may be determined to behind its target position. In some embodiments, in the event that an aircraft is determined to be behind a target position based on the variance in phase difference, the new trajectory determined for the aircraft is one that results in the aircraft moving towards a center of the original periodic trajectory, effectively cutting a corner to catch up. In the example shown, the aircraft in position 502 moves in a new trajectory to position 506. In the example shown, position 506 is closer to the center of trajectory 500 than position 502. In some embodiments, the new trajectory cuts into the original trajectory. The second aircraft, in this example, flies a relatively longer distance from position 504 to position 508. The aircraft are maneuvered to the new positions 506 and 508, respectively, in a way calculated so that they arrive in the new positions at the same time, resulting in their being in the target phase (180 degrees in this example) on the new trajectory 510. In the example shown, a new trajectory is determined for both aircraft; both the aircraft deviate from their original trajectory. The new trajectory may be shared. In some embodiments, an aircraft's trajectory is determined by a processor in the aircraft. In some embodiments, all aircraft trajectories are determined in an external processor that relays trajectory information to the aircraft.

In some embodiments, in the event that an aircraft is determined to be ahead of a target position based on the variance in phase difference, the new trajectory indicates that the aircraft moves away from a center of the first periodic trajectory. For example, the second aircraft in position 504 is ahead of its target position relative to the first aircraft in position 502. In the example shown, the new trajectory for the second aircraft results in the second aircraft being in position 508 when the first aircraft reaches position 506. In the example shown, the phase difference between positions 506 and 508 is the target phase difference. In the example shown, position 508 is further from the center of original trajectory 500 than position 504. In some embodiments, the new trajectory for the aircraft that is ahead cuts out of the original trajectory.

In some embodiments, the target steady state tether angle is calculated or set so as to maximize the efficiency of the system in a reference side wind or in a measured side wind, in a manner based on vehicle weight, flight speed, tether diameter and strength, and numerous other system parameters. The target tether angle from vertical used as the reference average angle may change from wind speed to wind speed so as to maximize gust rejection, minimize hovering energy, or maximize structural margin, depending on the particular mission.

In some embodiments, the first aircraft and the second aircraft are in communication while transitioning from their first positions to their second positions. For example, they are communicating GPS data, sensor data, camera data, or location data. In some embodiments, the communication allows the aircraft to adjust their trajectories in the event of unexpected redirections. In various embodiments, unexpected redirections are caused by wind, obstacles, turbulence, environmental factors, a delay in an aircraft processor execution, or any other factor.

In some embodiments, the new trajectory is a translation of the first periodic trajectory. In the example shown, new trajectory 510 comprising positions 506 and 508 is a translation of original trajectory 500. In some embodiments, the new trajectory remains near or within a set distance of the first trajectory the aircraft were flown in.

In some embodiments, some of the multiple aircraft tethered to the payload remain flying in the original trajectory. In some embodiments, in the event that the primary aircraft is behind a target position based on the phase difference, the primary aircraft determines a new trajectory that cuts into the original trajectory and rejoins the path of the original trajectory. For example, the new trajectory of the primary aircraft travels a shorter distance than the reference aircraft, which continues on the original trajectory. The primary aircraft then rejoins the path of the original trajectory at a specific time such that the phase difference between the primary aircraft and the reference aircraft is the target phase difference. In some embodiments, the new trajectory of the primary aircraft provides a shortcut to a position on the original trajectory.

In some embodiments, in the event that the primary aircraft is ahead of a target position based on the phase difference, the primary aircraft determines a new trajectory that cuts out of the original trajectory and rejoins the path of the original trajectory. In some embodiments, the new trajectory of the primary aircraft causes the primary aircraft to take a longer time to reach a position in the original trajectory than it would if it flew in the original trajectory. In some embodiments, the new trajectory of the primary aircraft allows the reference aircraft to relatively catch up, reinstating the target phase difference.

In some embodiments, the system for maintaining a target phase difference compensates for wind effects. For example, wind may cause an aircraft to fly at a ground speed different than the airspeed. In some embodiments, the system for maintaining a target phase difference causes a battery of an aircraft to be preserved. For example, rather than increasing throttle variations and thus using increased root mean squared (rms) battery power to adjust phase, the phase is adjusted by modifying a trajectory of an aircraft. In some embodiments, throttle adjustments are used as a secondary or supplementary method. In some embodiments, battery power of the aircraft is limited due to space or weight constraints. In some embodiments, a smaller or lighter aircraft is optimal for taking flight or gaining altitude easily.

In various embodiments, new trajectories may be computed by taking into consideration an objective relating to position relative to a fixed position on the ground and/or another reference. For example, adjustments may be made such that new trajectories tend to keep the aircraft and/or trajectory located within a given envelope, within a prescribed distance from a point on the ground, etc. In some embodiments, adjustment to correct for deviations from the target phase difference may be computed such that maneuvers to initiate the adjustment are initiated when the respective aircraft are in positions along the original trajectory such that the adjustments result in a translation of the trajectory in a desired direction, such as to move in a direction of a geostationary or other reference point.

Figure 6:
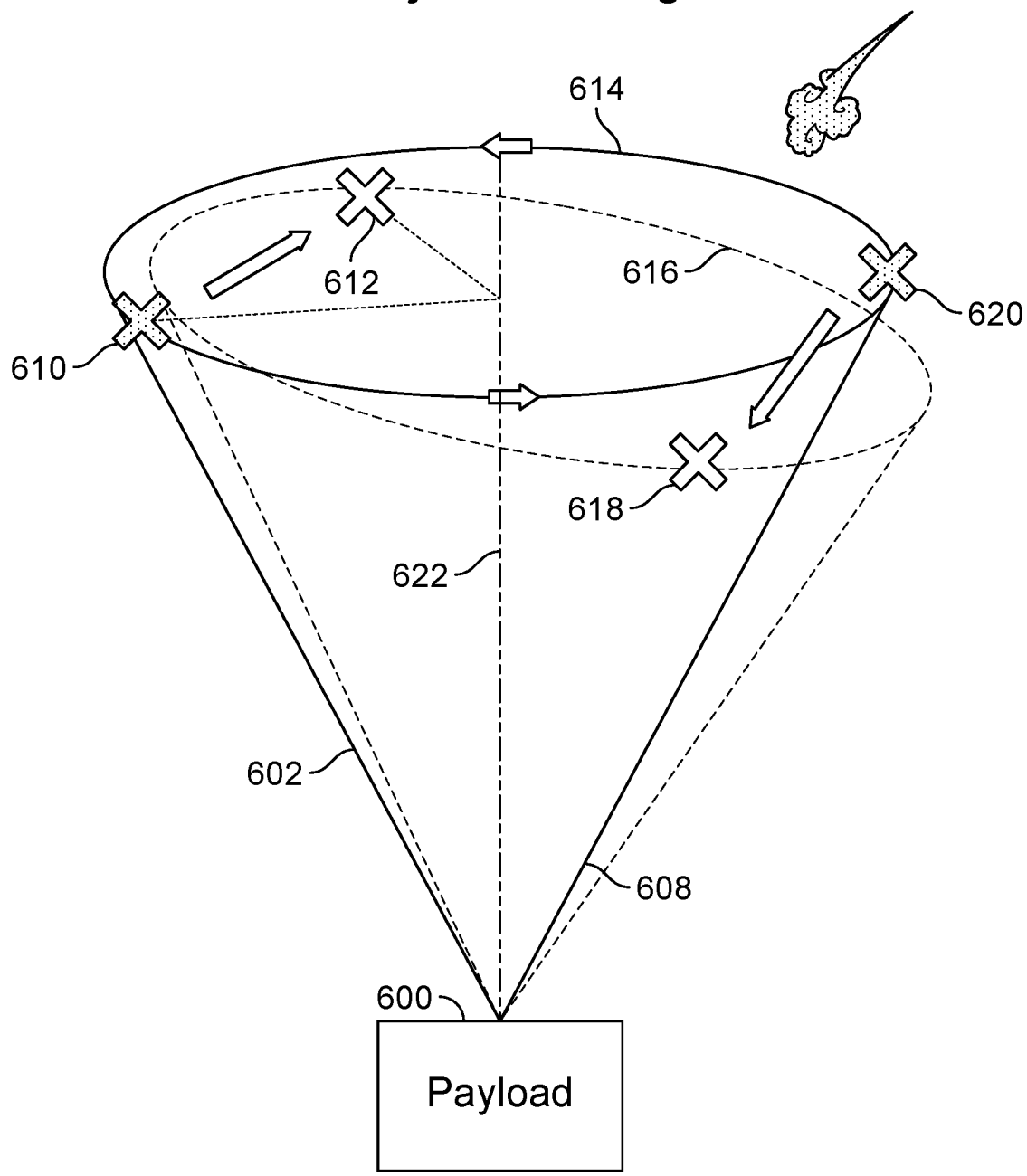
FIG. 6 is a diagram illustrating an embodiment of a load adjustment system.

FIG. 6 is a diagram illustrating an embodiment of a load adjustment system. In the example shown, a first aircraft in position 610 and a second aircraft in position 620 are flying in periodic trajectory 614. In the example, the first aircraft in position 610 and the second aircraft in position 620 are connected to payload 600 via tether 602 and tether 608, respectively. In some embodiments, the first aircraft in position 610 and the second aircraft in position 620 may be in the process of lifting payload 600 via tether 602 and tether 608.

In some embodiments, the first aircraft is configured to increase or decrease a radius of its elliptical trajectory based at least in part on whether the first aircraft is flying upwind or downwind. Increasing the radius may comprise one or more of the following: flying away from a vertical axis of the payload, increasing a tether angle of the aircraft, or decreasing an altitude of the aircraft. Decreasing the radius may comprise one or more of the following: flying towards a vertical axis of the payload, decreasing a tether angle of the aircraft, or increasing an altitude of the aircraft. In some embodiments, the first aircraft decreases the radius of its elliptical trajectory in the event the first aircraft is flying upwind. The first aircraft may increase the radius of its elliptical trajectory in the event the first aircraft is flying downwind. The first aircraft may be determined to be flying upwind or downwind based on one or more of the following: a speed, a direction, an air density, an air viscosity, an air compressibility, a speed of sound, lift information, or a tether tension. Decreasing the radius may increase the load experienced by the first aircraft due to the payload and increasing the radius may decrease the load experienced by the first aircraft due to the payload.

The radius may be a corresponding distance from the vertical axis of the payload associated with the original elliptical trajectory. In some embodiments, flying the first aircraft nearer to the vertical axis of the payload than a corresponding distance associated with the original elliptical trajectory increases the load experienced by the first aircraft due to the payload and decreases the load experienced by a second aircraft of the plurality of aircraft due to the payload. In some embodiments, flying the first aircraft further from the vertical axis of the payload than a corresponding distance associated with the original elliptical trajectory decreases the load experienced by the first aircraft due to the payload and increases the load experienced by a second aircraft of the plurality of aircraft due to the payload.

In some embodiments, a second aircraft of the plurality of aircraft is configured to fly nearer to the vertical axis of the payload than a corresponding distance associated with the original elliptical trajectory in the event the first aircraft flies further from the vertical axis of the payload than a corresponding distance associated with the original elliptical trajectory and is configured to fly further from the vertical axis of the payload than a corresponding distance associated with the original elliptical trajectory in the event the first aircraft flies nearer to the vertical axis of the payload than a corresponding distance associated with the original elliptical trajectory. In some embodiments, a second aircraft of the plurality of aircraft is configured to fly nearer to the vertical axis of the payload than a corresponding distance associated with the original elliptical trajectory in the event the second aircraft is flying upwind and is configured to fly further from the vertical axis of the payload than a corresponding distance associated with the original elliptical trajectory in the event the second aircraft is flying downwind.

In some embodiments, a lift information for the first aircraft is determined. The lift information may be determined by a processor within the aircraft. In some embodiments, the aircraft communicates with an external processor that is configured to compute lift information for the aircraft. In some embodiments, the aircraft comprises sensors and relays sensor information to its own processor or an external processor. The processor may determine lift information based on the sensor information. In some embodiments, the sensor information comprises wind information. In some embodiments, the wind information comprises one or more of the following: a speed, a direction, an air density, an air viscosity, or a speed of sound. The lift information may be based at least in part on the wind information. In some embodiments, an aircraft flying upwind or against the wind experiences increased lift compared to an aircraft flying downwind or in the direction of the wind. In some embodiments, a lift coefficient is determined for the aircraft. The lift information or lift coefficient for the first aircraft is compared to a lift information for the second aircraft. In some embodiments, a new position for the first aircraft or the second aircraft is determined based at least in part on the comparison of the lift information for the first aircraft to the lift information for the second aircraft. In some embodiments, the first or second aircraft further fly in the new trajectory or to the new position.

In some embodiments, the new position for the aircraft changes the altitude difference between the aircraft and another aircraft tethered to the payload. For example, the multiple aircraft may originally fly at the same altitude, and the new position causes an aircraft to fly at a higher altitude than the other aircraft. The distance from the aircraft to the payload may remain the same (e.g. the length of the tether), resulting in the aircraft moving to a position of higher altitude and of decreased distance to a vertical axis of the payload. The load on the upwind aircraft may be increased by moving the aircraft closer to a vertical axis of the payload than the other aircraft are. The relative difference from the vertical axis of the payload may be achieved by moving one aircraft or multiple aircraft.

In the example shown, the first aircraft in position 610 moves to new position 612. The second aircraft in position 620 moves to new position 618. In the example shown, the aircraft in position 612 and position 618 are flying in new periodic trajectory 618. In some embodiments, new position 612 and new position 618 are determined based on the wind information for the first and second aircraft. In some embodiments, the new position for the aircraft changes the load experienced by the aircraft due to the payload. In some embodiments, the new position comprises a change in altitude. In some embodiments, the new position maintains a distance from the tethered aircraft to the payload. In some embodiments, the tethers are taut in the original and new position. In some embodiments, the new position increases the load on the first aircraft in the event the wind information indicates the first aircraft is upwind. In some embodiments, the new position decreases the load on the first aircraft in the event the wind information indicates the first aircraft is downwind. An aircraft may be determined to be upwind due to a high tether tension on the aircraft's tether. The high tether tension may be caused by the wind generating lift for the aircraft.

In the example shown, the first aircraft in position 610 may have been flying upwind, whereas the second aircraft in position 620 was flying downwind. As a result, the first aircraft in position 610 experienced greater lift than the second aircraft in position 620. In some embodiments, flying the aircraft in a new trajectory compensates for wind effects. Adjusting the loads on the aircraft as disclosed herein may fix the dynamic pressure imbalance by both loading the upwind aircraft more, decreasing its speed by increasing its altitude, and decreasing its speed by reduced thrust and increased drag through increased lifting. For example, the two aircraft might have a flight speed of 20 meters per second (m/s) in a 10 m/s wind, resulting if no course corrections were made in 30 m/s apparent wind on the upwind vehicle and 10 m/s apparent wind on the downwind vehicle, further resulting, if no changes in angle of attack or aerodynamic control settings were made, in roughly 9 times the lift on the upwind vehicle. By adjusting speed, angle of attack, altitude, and thrust, the speeds may be made more commensurate, while the adjustment to phase may also allow the upwind vehicle to carry more of the lift such that the lift imbalance would not create a substantial sideways acceleration on the payload. In the example shown, the first aircraft moved from position 610 to a higher altitude at position 612 while the second aircraft moved from position 620 to a lower altitude at position 618. In the example shown, position 612 is closer to the payload's vertical axis than position 618. The distance from the aircraft to the payload may be the length of the tethers and remain unchanged throughout the process. The vertical component of the force exerted by an aircraft increases as the aircraft becomes closer to directly over the center of the payload. Increasing the vertical component of the force exerted by an aircraft increases the load experienced by the aircraft. In some embodiments, the first aircraft experiences a greater load than the second aircraft.

In the example shown, vertical axis 622 of payload 600 extends from the center of the payload. Position 610 is further away from axis 622 than position 612. Position 612 is closer to vertical axis 622 than the corresponding position on trajectory 614. By moving to position 612, the first aircraft is closer to vertical axis 622 than it would be had it followed trajectory 614.

In some embodiments, the first aircraft returns to its original shared elliptical trajectory after increasing or decreasing the radius of its elliptical trajectory for a period of time. The first aircraft may divert from the original elliptical trajectory in the event the first aircraft is flying upwind or downwind and return to the original elliptical trajectory in the event the first aircraft is no longer flying upwind or downwind. In some embodiments, the new trajectory of the aircrafts is determined via a gain schedule. A time duration or a distance the first aircraft flies nearer to or further from the vertical axis of the payload may be determined based on the gain schedule. The gain schedule may map a wind speed to a quantitative change in an aircraft trajectory. For example, a sensor input (e.g. wind direction, wind speed, or tether tension) is mapped to a change in distance from the vertical axis of the payload. The mapping may be linear, exponential, or any appropriate relationship. In some embodiments, the gain schedule is determined in order to maximize the lift capacity of the multiple aircraft setup. In some embodiments, the gain schedule is determined via simulations of the aircraft and payload system. A simulation may be run by testing a variety of gain schedules with a variety of payload masses. The gain schedule used in the load adjustment system may be the gain schedule that was able to lift a payload of the greatest mass in simulation.

In the example shown, new trajectory 618 is a translation of original trajectory 614. In some embodiments, the trajectory of the aircraft varies within a set distance from the first trajectory. In some embodiments, the system for adjusting a load aids in equalizing the speeds of the aircraft. For example, as an aircraft climbs to a position of greater altitude, the aircraft is flying at a slower speed then when flying at a stable altitude (e.g. when throttle is not changed). Alternatively, as an aircraft dives to reach a new position of a lower altitude, the aircraft gains speed. In some embodiments, the aircraft fly in a compact trajectory that requires airspeed equalization.

In some embodiments, the first or primary aircraft changes its trajectory to a different altitude or distance from the vertical axis of the payload, while the second or reference aircraft maintains its original trajectory. In some embodiments, both aircraft adjust their trajectories. In some embodiments, the first and the second aircraft are in communication while adjusting their trajectories and monitoring the other aircraft's position.

In some embodiments, changing the position or trajectory of the first aircraft or the second aircraft causes a battery of the first aircraft or a battery of the second aircraft to be preserved. The battery may be preserved through a reduction in average energy utilization at a given lift. In some embodiments, the position change adjusts the load experienced by the aircraft, allowing the aircraft to more efficiently lift the payload.

In some embodiments, the system for load adjustment is executed simultaneously with the system for phase management or other elements of the aircraft flight control system. In some embodiments, a new trajectory is determined based on both phase management and load adjustment factors. In some embodiments, an upwind aircraft cuts in to the original trajectory and also increases its altitude. In some embodiments, a downwind aircraft cuts out of the original trajectory and decreases its altitude.

Figure 7A:
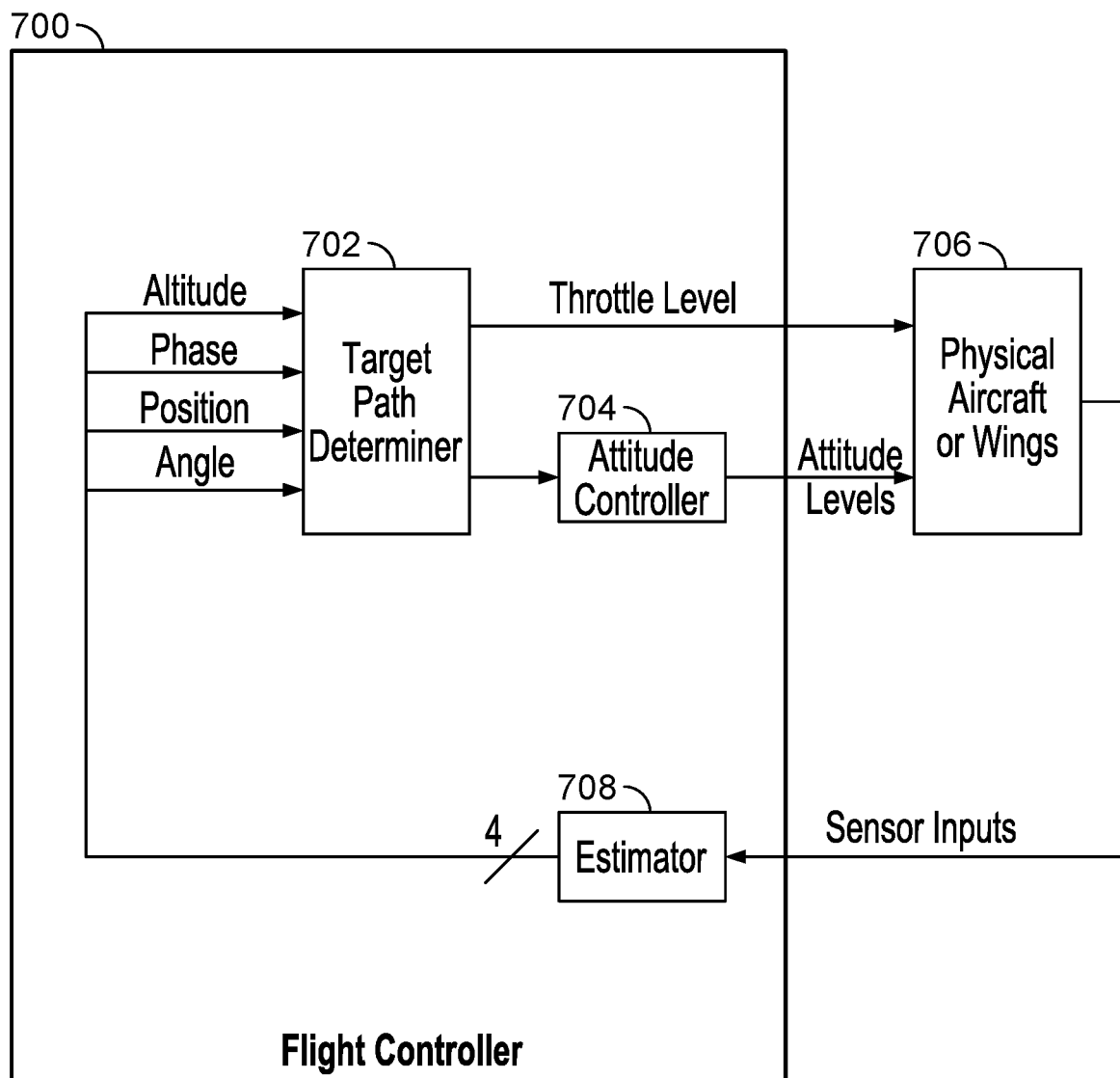
FIG. 7A is a block diagram illustrating an embodiment of a process to transport a payload using multiple lift aircraft.

FIG. 7A is a block diagram illustrating an embodiment of a process to transport a payload using multiple lift aircraft. In the example shown, flight controller 700 comprises target path determiner 702, attitude controller 704, and estimator 708. In the example shown, target path determiner 702 receives altitude, phase, position, and angle inputs. The inputs may be related to an aircraft that the flight controller is controlling. In some embodiments, target path determiner 702 determines a trajectory for the aircraft based on the inputs. Based on the inputs, target path determiner 702 may determine the aircraft is ahead in phase, behind in phase, flying upwind, flying downwind, engaged in a forward flight configuration, or any other position information. In some embodiments, target path determiner 702 translates the target path into a throttle level or attitude change of the aircraft. In the example shown, attitude controller 704 receives an input from target path determiner 702 (e.g. the target path) and provides corresponding attitude levels to physical aircraft or wings 706. Target path determiner 702 provides a throttle level to physical aircraft or wings 706. In some embodiments, physical aircraft or wings 706 translates the signals received as appropriate and sends the signals to the servos in the physical wings or other physical parts of the flight vehicle. In some embodiments, trajectory change is enacted due to the physical configuration changes made to the aircraft (e.g. flapping wings, etc.). In the example shown, physical aircraft or wings 706 provides sensor inputs to estimator 708. In some embodiments, estimator 708 is a measuring device that determines the attitude, phase, position, or angle of the aircraft based on sensor inputs. Estimator 708 may feed the information back to target path determiner 702. In various embodiments, the block diagram shown represents a maintaining target phase difference system, load adjustment system, or forward flight configurations system.

Figure 7B:
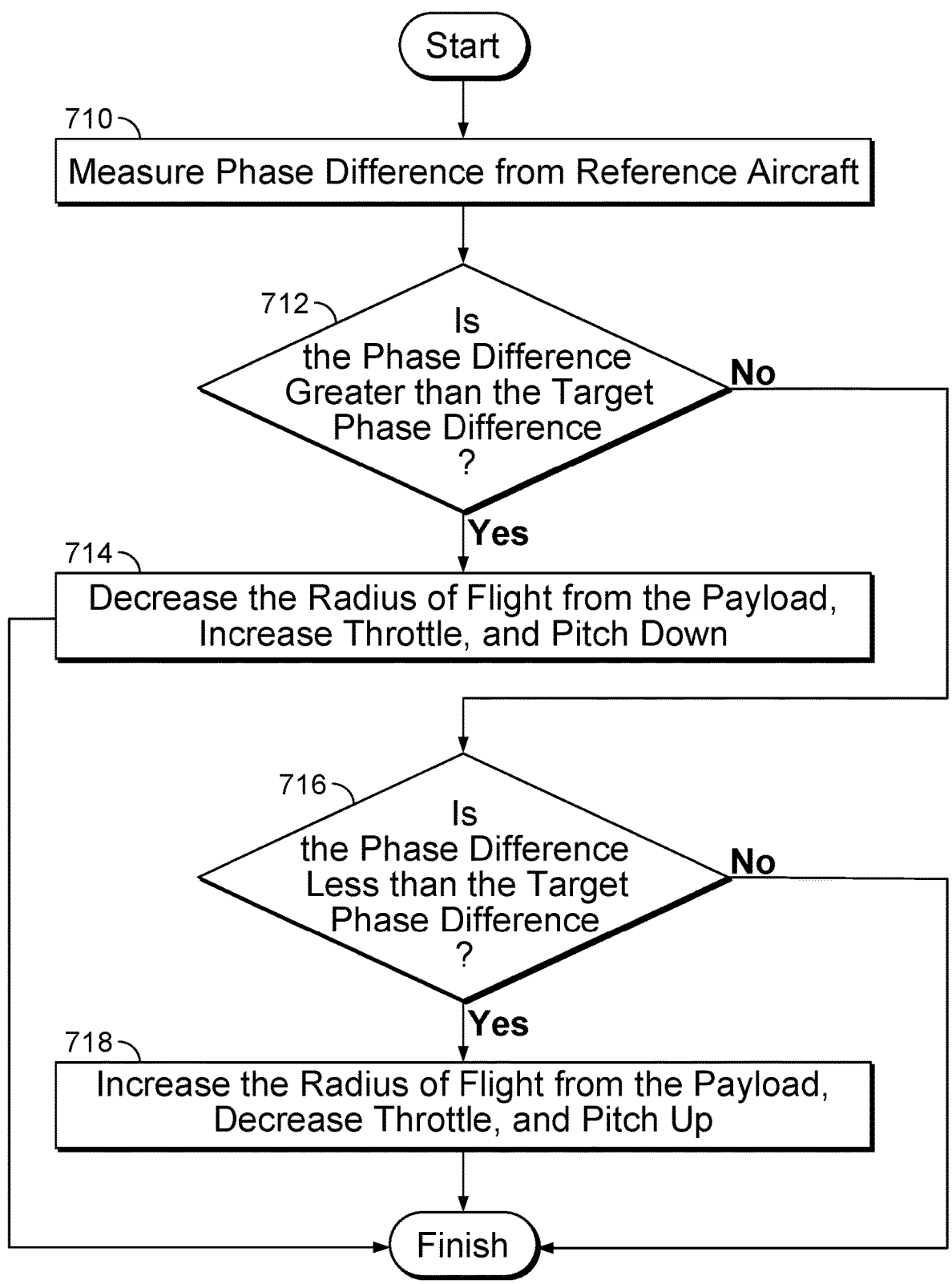
FIG. 7B is a flow diagram illustrating an embodiment of a process to transport a payload using multiple lift aircraft.

FIG. 7B is a flow diagram illustrating an embodiment of a process to transport a payload using multiple lift aircraft. In some embodiments, the actions of the flow diagram are executed by the primary aircraft. In 710, phase difference from the reference aircraft is measured. In some embodiments, the phase difference is determined using sensors or cameras. In 712 it is determined whether the phase difference is greater than the target phase difference. Experiencing a phase difference greater than the target phase difference may indicate the primary aircraft is behind its target position.

In the event that the phase difference is greater than the target phase difference, in 714 the radius of flight from the payload is decreased, throttle is increased, and the aircraft pitches down. In some embodiments, one or more of the three actions are executed. Decreasing the radius of flight from the payload may allow the primary aircraft to take a shorter path than the reference aircraft and decrease the amount the primary aircraft is behind. In some embodiments, the primary aircraft and the reference aircraft fly in a translation of their original shared trajectory. In some embodiments, the primary aircraft temporarily deviates from its original trajectory while the reference aircraft remains in the original trajectory. Increasing throttle may allow the primary aircraft to move faster than the reference aircraft and effectively catch up. Increasing throttle may be a secondary or supplementary phase control action. In some embodiments, the aircraft pitches its wings down. However, the aircraft may move to a higher altitude overall. A primary aircraft that experiences a greater phase difference from the target may be flying upwind. Flying upwind may cause an aircraft to fly at a slower ground speed than in the absence of wind. In some embodiments, flying upwind causes the aircraft to experience greater lift and move to a higher altitude. Pitching down may mitigate the effect of the wind and prevent the aircraft from increasing in altitude more than is efficient. Pitching down may allow the aircraft to move to a radius and altitude that allows for the most efficient lift capacity of the multiple aircraft system. Following 714, the process is finished.

In the event that the phase difference is not greater than the target phase difference, in 710 it is determined whether the phase difference is less than the target phase difference. In the event that the phase difference is not less than the target phase difference, the process is finished. In the event that the phase difference is less than the target phase difference, in 718 the radius of flight from the payload is increased, throttle is decreased, and the aircraft pitches up. In some embodiments, the radius of flight from the payload is decreased to force the aircraft to take a longer path than the path of the original trajectory before rejoining the original trajectory. The throttle decrease may cause the primary aircraft to travel more slowly than the reference aircraft. The actions may adjust for the primary aircraft flying ahead of phase. In some embodiments, the primary aircraft is ahead of phase due to flying downwind. The primary aircraft may experience less lift than the reference aircraft flying upwind. The primary aircraft may fly at a lower altitude due to increasing its radius of flight from the payload's axis and flying with a taut, fixed-length tether. In some embodiments, the primary aircraft pitches its wings up in order to mitigate its downward flight. For example, the aircraft may fly at an increased speed due to flying towards a decreased altitude when increasing its radius. The aircraft may pitch its wings up to prevent the aircraft from diving too quickly. Pitching up may allow the aircraft to slow itself down.

Figure 7C:
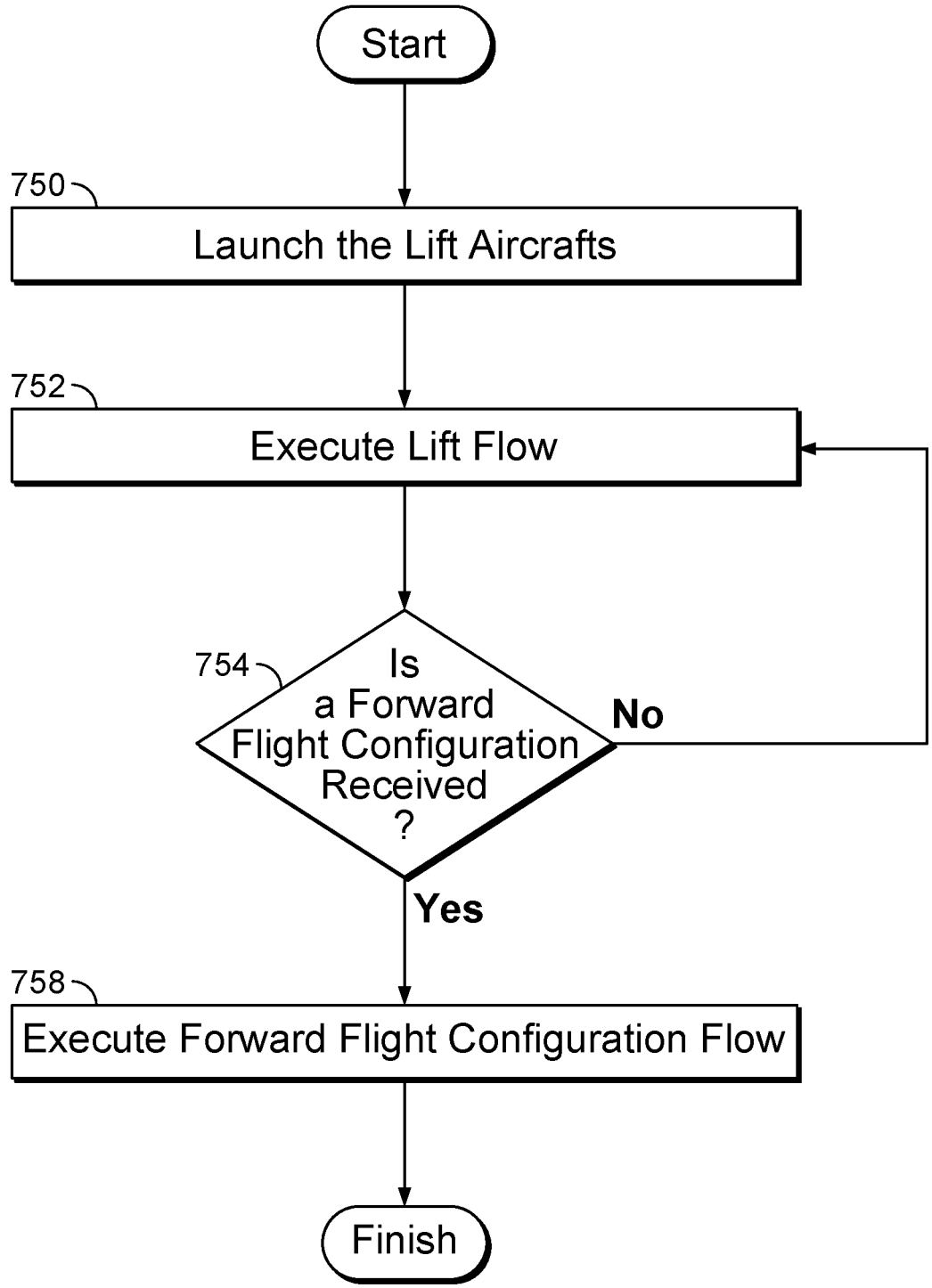
FIG. 7C is a flow diagram illustrating an embodiment of a process to transport a payload using multiple lift aircraft.

FIG. 7C is a flow diagram illustrating an embodiment of a process to transport a payload using multiple lift aircraft. In 750, the lift aircraft are launched. In some embodiments, two lift aircraft are launched. In some embodiments, more than two lift aircraft are launched. In 752, a lift flow is executed. In some embodiments, the lift flow is implemented by the lift flow described in FIG. 8. In 754, it is determined whether an indication to transition to a forward flight configuration is received. In the event an indication to transition to a forward flight configuration is not received, control passes to 752. In the event an indication to transition to a forward flight configuration is received, a forward flight configuration flow is executed in 756. In some embodiments, execution of a transition is gated on various state criteria which are set to maximize margin, in the sense of any of structural, control, stability, or statistical margin, before a forward flight configuration flow is executed in 756. In some embodiments, the forward flight configuration flow is implemented by the forward flight configuration flow described in FIG. 14. In some embodiments, a landing flow may be executed following the forward flight configuration flow. To execute a transition to forward flight, the target center location in hovering mode flight may be accelerated until a substantial sideways velocity is built up, after which point the lift aircraft either fully transitions lift onto the payload, or after which point they transition to a substantially forward or figure eight flight pattern so as they transition lift onto the payload's wings. After lift is fully transferred, the aircraft may continue to tow the payload from a substantially forward position or are towed by the payload from a substantially rearward position.

Figure 8:
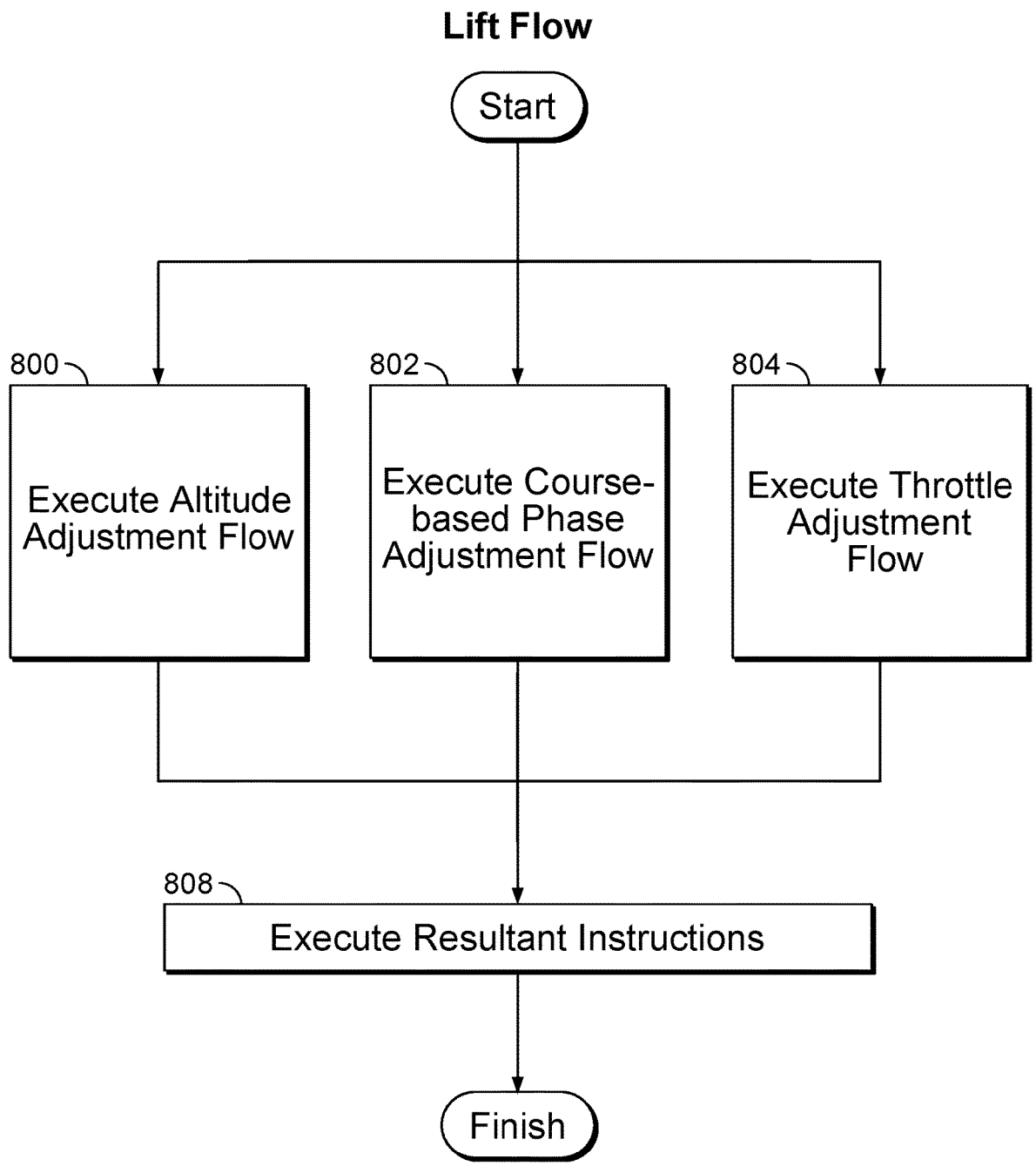
FIG. 8 is a flow diagram illustrating an embodiment of a process to lift a payload using multiple lift aircraft.

FIG. 8 is a flow diagram illustrating an embodiment of a process to lift a payload using multiple lift aircraft. In some embodiments, a first aircraft and a second aircraft may implement the process of FIG. 8 to lift the payload via tethers. In 802, a course-based phase adjustment flow is executed. In some embodiments, the course-based phase adjustment flow is implemented by the course-based phase adjustment flow described in FIG. 10. In some embodiments, it is determined whether the course-based phase adjustment optimally decreases the phase variance. In some embodiments, the phase variance is a variance from the target phase difference between the first aircraft and the second aircraft. In some embodiments, the optimal method of decreasing the phase variance is based on predetermined factors, such as a maximum distance the trajectory can be translated or a threshold for a distance moved from the trajectory. In the event it is determined that the course-based phase adjustment does not optimally decrease the phase variance, a throttle adjustment flow may be executed. In some embodiments, the throttle adjustment flow is implemented by the throttle adjustment flow described in FIG. 9. In the example shown, the throttle adjustment flow is executed in 804 in parallel with the course based phase adjustment flow and altitude adjustment flow 800. In some embodiments, the altitude adjustment flow is implemented by the load adjustment flow described in FIG. 11A. In 808, resultant instructions are executed. In some embodiments, the instructions comprise instructions for the first aircraft or the second aircraft to fly in a new trajectory. In some embodiments, the instructions comprise instructions for the payload or aircraft to change power levels or speed.

Figure 9:
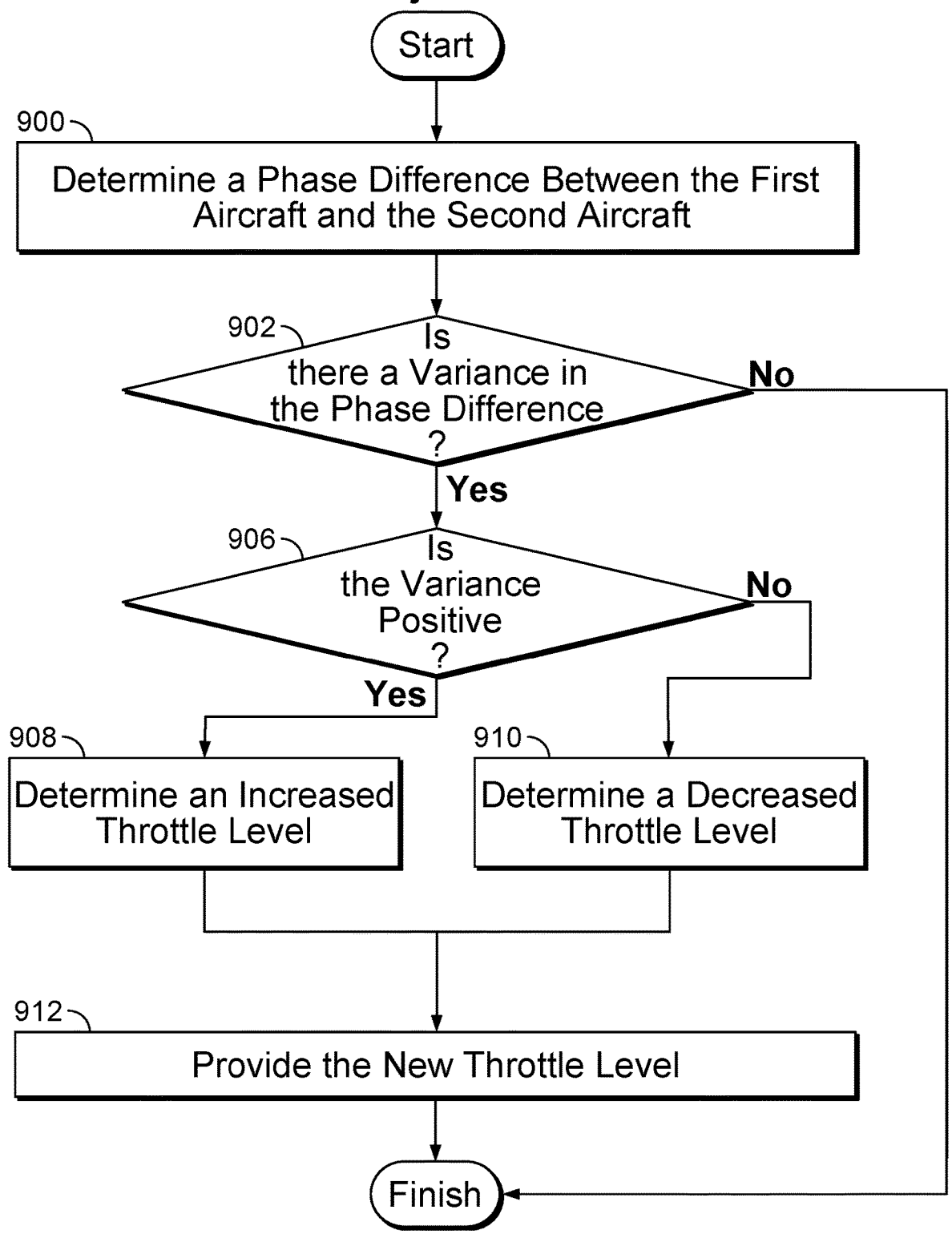
FIG. 9 is a flow diagram illustrating an embodiment of a process to maintain a target phase difference using throttle adjustment.

FIG. 9 is a flow diagram illustrating an embodiment of a process to maintain a target phase difference using throttle adjustment. In 900, a phase difference between the first aircraft and the second aircraft is determined. In 902, it is determined whether there is a variance in the phase difference. In the event that it is determined there is no variance in phase, the process is finished. For example, no variance in phase indicates the phase difference between the first aircraft and the second aircraft is the target phase difference and no further action is required. In some embodiments, the phase difference is checked based on a time interval, a trigger, or an indication from a system user. In the event it is determined there is a variance in phase, in 906 it is determined whether the variance in positive. For example, from the perspective of the first aircraft, a positive variance indicates the phase difference from the front of the first aircraft to the back of the second aircraft is greater than the target phase difference. In the event the variance is positive, in 908 an increased throttle level is determined. In some embodiments, an increased throttle level is provided in order speed up the first aircraft and catch up to its position. In the event the variance is not positive, in 910 a decreased throttle level is determined. In some embodiments, the decreased throttle is determined because the aircraft is relatively ahead. In 912, the new throttle level is provided. In some embodiments, the new throttle level comprises instructions to implement the new throttle level.

Figure 10:
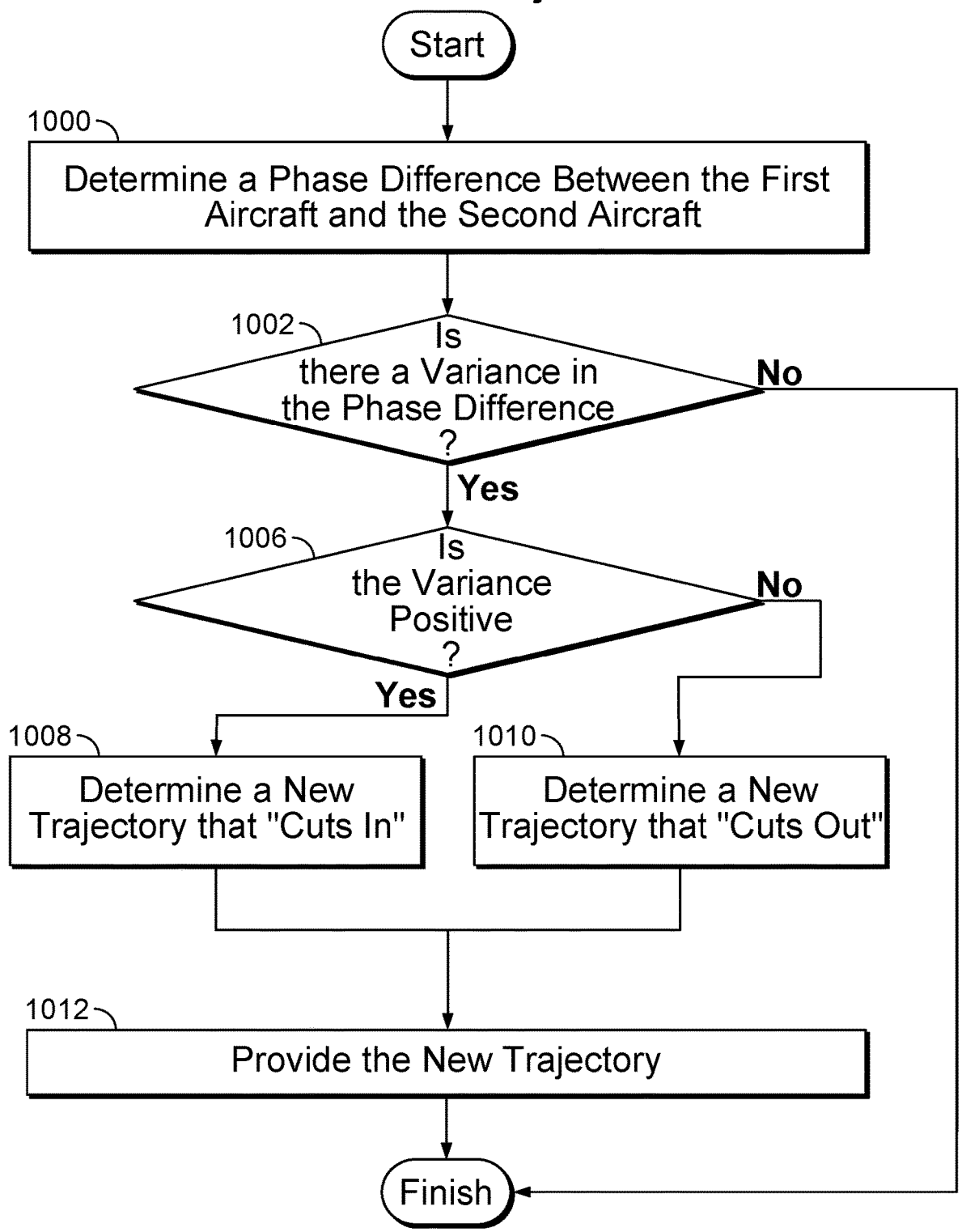
FIG. 10 is a flow diagram illustrating an embodiment of a process to maintain a target phase difference using trajectory adjustment.

FIG. 10 is a flow diagram illustrating an embodiment of a process to maintain a target phase difference using trajectory adjustment. In 1000, a phase difference between the first aircraft and the second aircraft is determined. In some embodiments, the phase difference is determined using a proportional-integral-derivative controller. In some embodiments, the phase difference is determined based on a detected acceleration, velocity, position, GPS information, or sensor information. In 1002, it is determined whether there is a variance in the phase difference. In the event that there is no variance in the phase difference, the process is finished. In the event that there is a variance in the phase difference, in 1006 it is determined whether the variance is positive. In the event the variance is positive, in 1008 a new trajectory that "cuts in" is determined. In some embodiments, a trajectory that "cuts in" is a new trajectory that causes the aircraft to fly closer to the center of the original trajectory. In some embodiments, the new trajectory allows the aircraft to travel in a short path from one position in the original trajectory to another position in the original trajectory (e.g. a path that is shorter than the path on the original trajectory). In some embodiments, the aircraft "cuts in" while another aircraft tethered to the payload complementarily "cuts out," effectively translating the trajectory. In some embodiments, the aircraft's new trajectory allows the aircraft to catch up and decrease the variance in phase. In the event the variance is not positive, in 1010 a new trajectory that "cuts out" is determined. In some embodiments, a trajectory that "cuts out" causes the aircraft to fly away from the center of the original trajectory. In some embodiments a trajectory that "cuts out" causes the aircraft to take a longer path to a position on the original trajectory than if the aircraft had continued in the original trajectory. In some embodiments, as the aircraft "cuts out," another aircraft tethered to the payload "cuts in." In 1012, the new trajectory is provided.

Figure 11A:
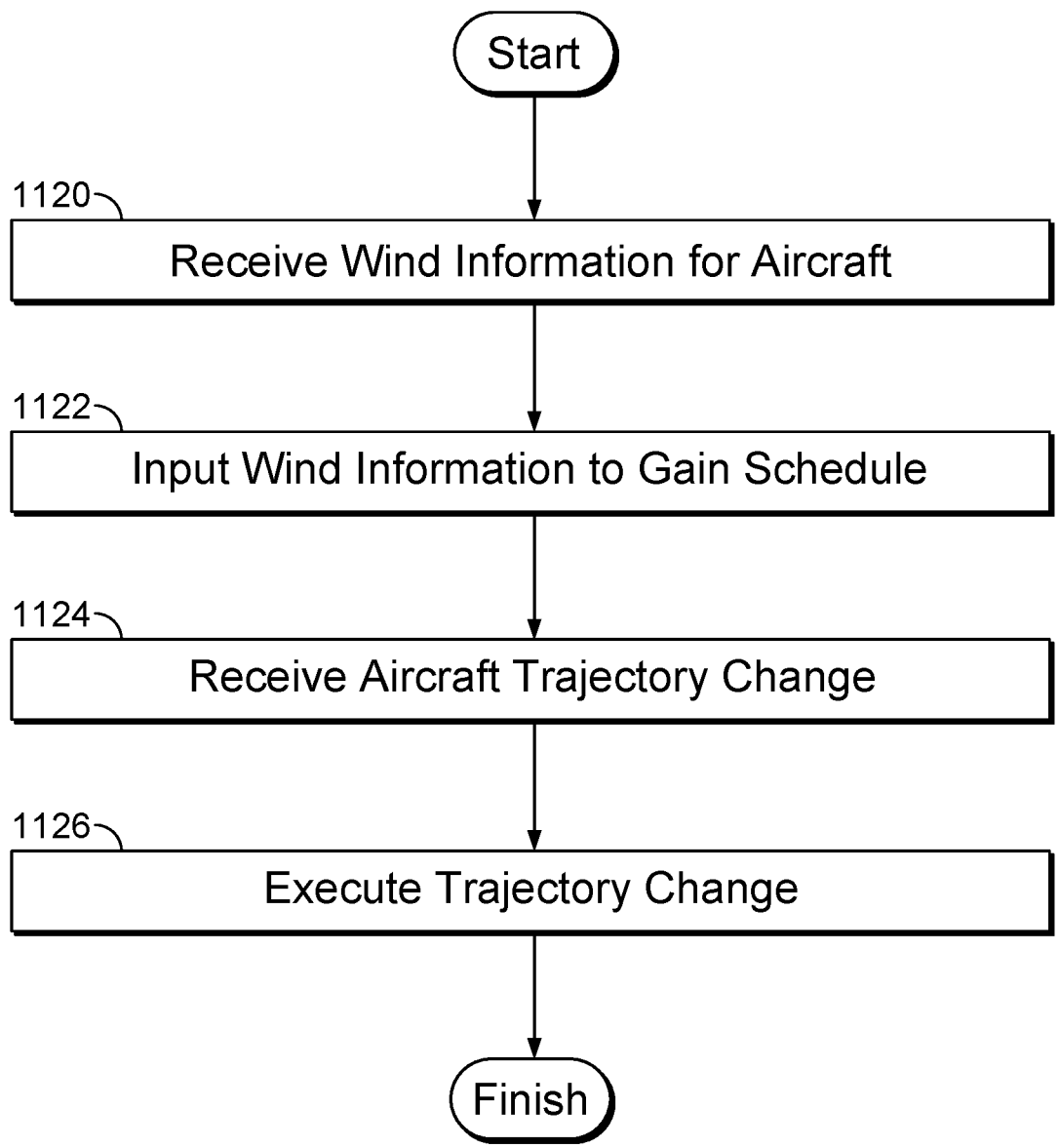
FIG. 11A is a flow diagram illustrating an embodiment of a load adjustment process.

FIG. 11A is a flow diagram illustrating an embodiment of a load adjustment process. In 1120, wind information for an aircraft is received. In 1122, the wind information is input to a gain schedule. In some embodiments, a processor determines whether the aircraft is upwind or downwind based on the wind information before 1122. In some embodiments, the gain schedule takes into account the direction of the wind. In some embodiments, the gain schedule provides an aircraft trajectory change based on the wind information. In 1124, an aircraft trajectory change is received. The aircraft trajectory change may comprise a new elliptical trajectory to fly the aircraft in, or an adjustment to the current trajectory that causes the aircraft to fly nearer to or further from the vertical axis of the payload. In 1126, the trajectory change is executed.

Figure 11B:
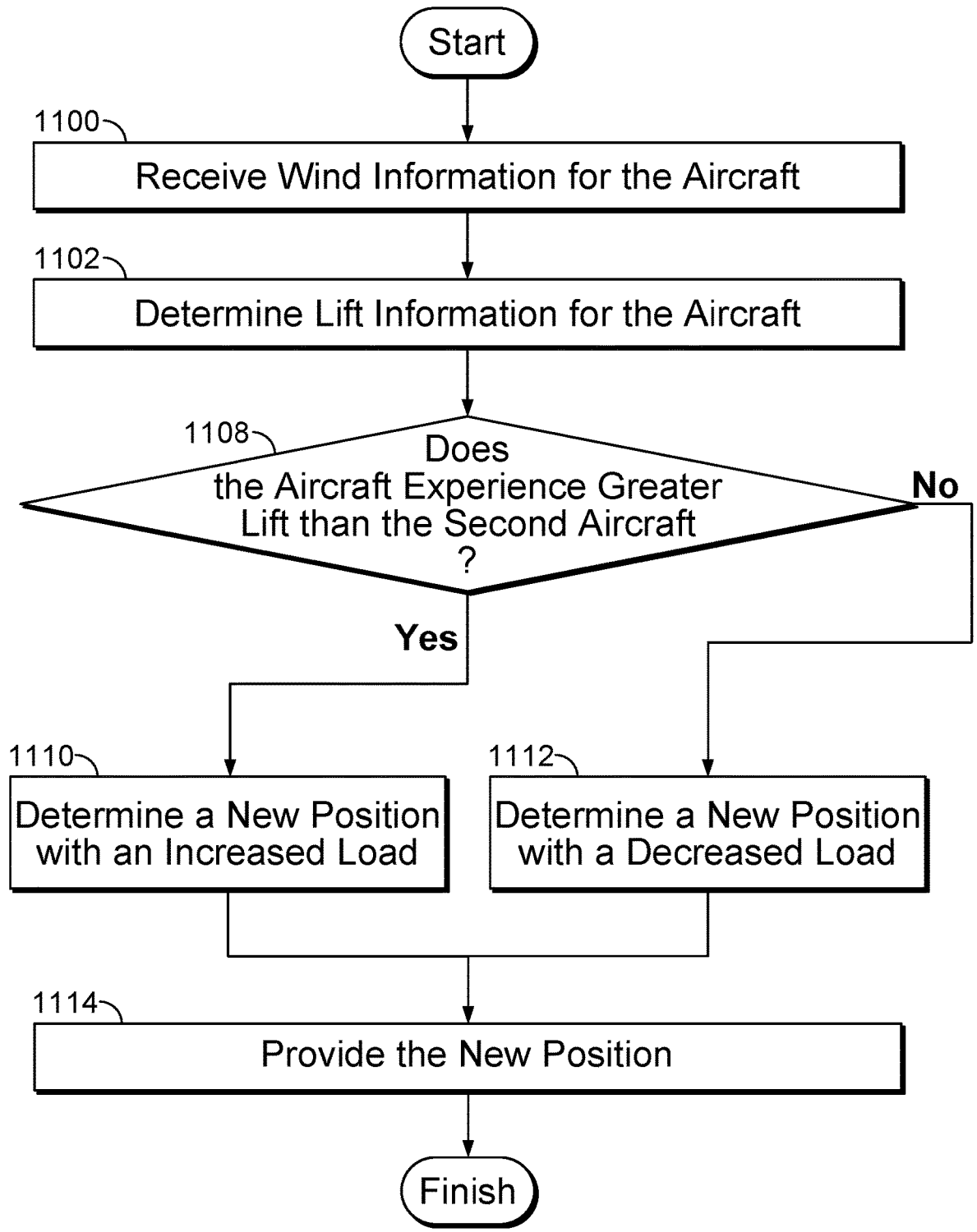
FIG. 11B is a flow diagram illustrating an embodiment of a load adjustment process.

FIG. 11B is a flow diagram illustrating an embodiment of a load adjustment process. In 1100, wind information for the aircraft is received. In some embodiments, wind information is collected using sensors or measurement apparatuses on the aircraft. In 1102, lift information for the aircraft is determined. In some embodiments, lift information comprises a lift coefficient. In some embodiments, lift is compared using a lift coefficient. In some embodiments, in the event that the aircraft experience equal lift, the loads do not need to be adjusted on the respective aircraft because they experience equal loads in the original positioning. The original positioning may comprise the aircraft flying at the same altitude. In 1108 it is determined whether the aircraft with respect to which the process of FIG. 11 is being performed experiences greater lift than the second aircraft. In the event that that the aircraft experiences greater lift than the second aircraft, in 1110 a new position with an increased load is determined.

In some embodiments, determining lift information for the aircraft is not necessary. Instead, the aircraft determine new positions or trajectories based on wind information alone (e.g. whether the aircraft are flying upwind or downwind).

In some embodiments, the new position is at a higher altitude relative to the previous position. In some embodiments, the new position is part of a temporary new trajectory that has a smaller radius or tether angle with respective to the vertical axis of the payload. The new position may be at a higher altitude relative to the second aircraft. In the event that that the aircraft experiences less lift, in 1112 a new position with a decreased load is determined. In some embodiments, the new position is at a lower altitude or further from the vertical axis of the payload. In 1114, the new position is provided. In some embodiments, instructions for moving to the new position are provided. The new position may be a part of a new trajectory the aircraft is flying in. The aircraft may be in the process of lifting the payload. The new position may be a part of a new trajectory that is effectively a tilted version of a previous elliptical trajectory.

Figure 12A:
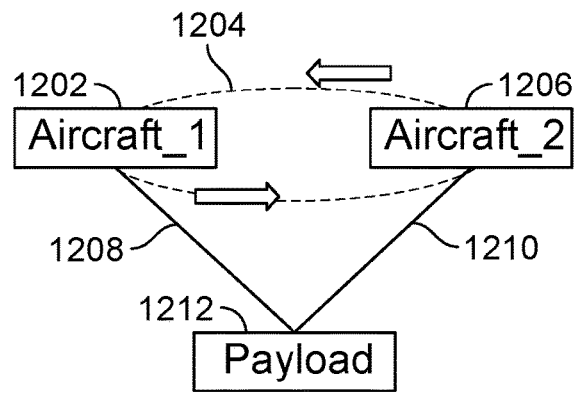
FIG. 12A is a diagram illustrating an embodiment of a system to lift a payload.

FIG. 12A is a diagram illustrating an embodiment of a system to lift a payload. FIG. 12A is a diagram illustrating the lift configuration of the flight configuration. In some embodiments, the lift configuration comprises the lift aircraft and a second lift aircraft flying in a periodic trajectory. In the example shown, aircraft_1 1202 and aircraft_2 1206 fly in continuous periodic trajectory 1204. In some embodiments, the lift configuration comprises the lift aircraft and a second lift aircraft flying in a periodic trajectory with a fixed phase difference between the lift aircraft and the second lift aircraft. In some embodiments, aircraft_1 1202 lifts payload 1212 via tether 1208 and aircraft_2 1206 lifts payload 1212 via tether 1210. In some embodiments, a system for phase maintenance and a system for load adjustment are concurrently executed on the aircraft and payload.

Figure 12B:
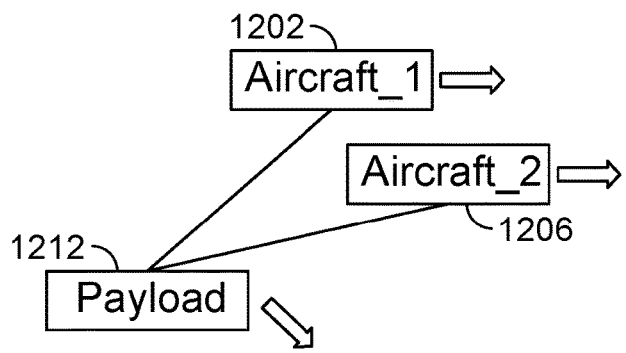
FIG. 12B is a diagram illustrating the system of FIG. 12A in a first position of a transition to a flight configuration in which the payload tows the lift aircraft.

FIG. 12B is a diagram illustrating the system of FIG. 12A in a first position of a transition to a flight configuration in which the payload tows the lift aircraft. In the example shown, aircraft_1 1202, aircraft_2 1206, and payload 1212 have begun to transition from the lift configuration as shown in FIG. 12A to a forward flight configuration. Aircraft_1 1202 and aircraft_2 1206 are shown as having executed coordinated maneuvers to transition to forward flight, in a direction to the right as shown. At the same time, payload 1212, which in this example is itself capable of at least forward flight, is shown to be maneuvering down and under the lift aircraft 1202, 1206. In some embodiments, the forward flight configuration comprises a change in a target phase difference between the lift aircraft and a second lift aircraft. In some embodiments, aircraft_1 1202 and aircraft B 1206 no longer maintain a target phase difference between them. In some embodiments, aircraft_1 1202 and aircraft_2 1206 engage in forward flight. In some embodiments, one aircraft slides forward from the original continuous periodic trajectory while the other aircraft slides back or flies forward at a relatively slower speed, resulting in them flying in the same direction. In some embodiments, the first aircraft flies in a straight path rather than in the periodic trajectory, and the second aircraft follows until the two aircraft are flying in parallel. In some embodiments, aircraft_1 1202 and aircraft_2 1206 fly at an upward incline. In some embodiments, payload 1212 flies under aircraft_1 1202 and aircraft_2 1206, as shown.

Figure 12C:
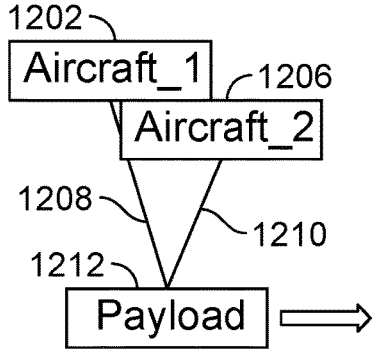
FIG. 12C is a diagram illustrating the system of FIG. 12A in a second position of a transition to a flight configuration in which the payload tows the lift aircraft.

FIG. 12C is a diagram illustrating the system of FIG. 12A in a second position of a transition to a flight configuration in which the payload tows the lift aircraft. In the example shown, payload 1212 flies under and past aircraft_1 1202 and aircraft_2 1206. In some embodiments, the series of steps for the transition to forward flight comprise increasing or decreasing power to one or more of the powered payload and the lift aircraft. In some embodiments, payload 1212 flies at a greater speed than the lift aircraft 1202, 1206. In some embodiments, tether 1208 and tether 1210 have slack as payload 1212 flies past the lift aircraft 1202, 1206.

Figure 12D:
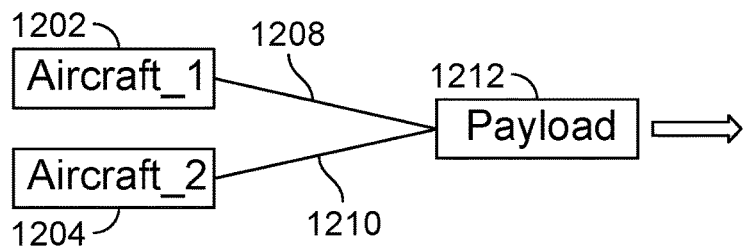
FIG. 12D is a diagram illustrating the system of FIG. 12A in a flight configuration in which the payload is towing the lift aircraft.

FIG. 12D is a diagram illustrating the system of FIG. 12A in a flight configuration in which the payload is towing the lift aircraft. In some embodiments, the payload is powered and comprises a motor. In the example shown, the powered payload 1212 tows the lift aircraft 1202, 1206 behind the powered payload 1212. The angle between the first lift aircraft and the second lift aircraft may be determined to minimize tether drag. In some embodiments, a ten degree angle between the aircraft results in a minimal drag of three percent. In some embodiments, the forward flight configuration comprises the first lift aircraft and a second lift aircraft flying in parallel. In some embodiments, the first or second lift aircraft comprises propellers that are spun as the payload tows the aircraft. In some embodiments, the propellers are used to recharge batteries as the aircraft is dragged. In some embodiments, the payload is cruise optimized or comprises a wing. In some embodiments, the aircraft are optimized for lifting the payload and are light. In some embodiments, the majority of the battery power for the system is supplied by the payload.

Figure 13A:
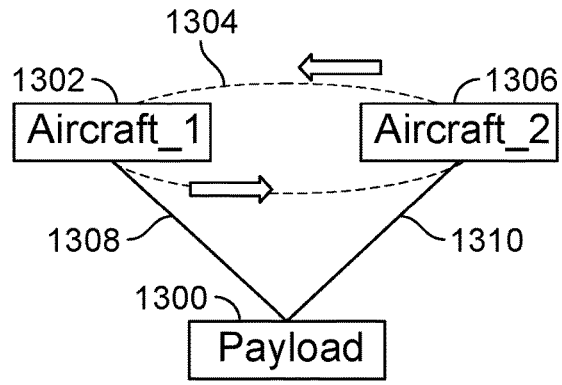
FIG. 13A is a diagram illustrating an embodiment of a system to lift a payload.

FIG. 13A is a diagram illustrating an embodiment of a system to lift a payload. FIG. 13A is a diagram illustrating the lift configuration. In the example shown, aircraft_1 1302 and aircraft_2 1306 fly in continuous periodic trajectory 1304. In the example shown, aircraft_1 1302 lifts payload 1300 via tether 1308 and aircraft_2 1306 lifts payload 1300 via tether 1310.

Figure 13B:
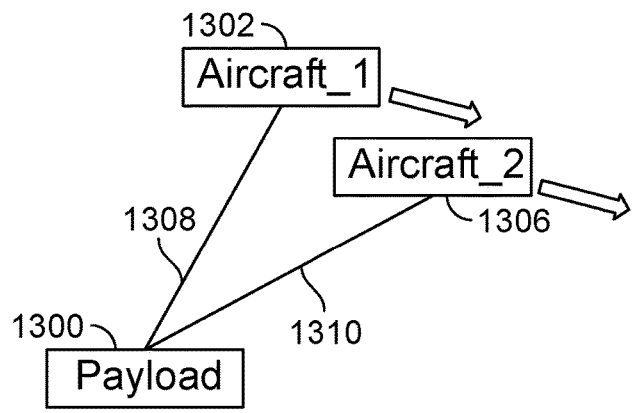
FIG. 13B is a diagram illustrating the system of FIG. 13A in a first position of a transition to a flight configuration in which the aircraft is towing the payload.

FIG. 13B is a diagram illustrating the system of FIG. 13A in a first position of a transition to a flight configuration in which the aircraft is towing the payload. In some embodiments, aircraft_1 1302 and aircraft_2 1306 engage in forward flight. In some embodiments, the aircraft switch from a phase maintenance mode to a forward flight mode. In some embodiments, aircraft_1 1302 and aircraft_2 1306 fly at an incline toward the ground. In some embodiments, payload 1300 experiences lift while it is towed behind by tether 1308 and tether 1310. In some embodiments, the aircraft and payload are in communication to coordinate the transition. In some embodiments, payload 1300, aircraft_1 1302, and aircraft_2 1306 adjust their trajectories in order to fly at similar altitudes. In some embodiments, the powered payload and an aircraft each receive telemetry information about the other.

Figure 13C:
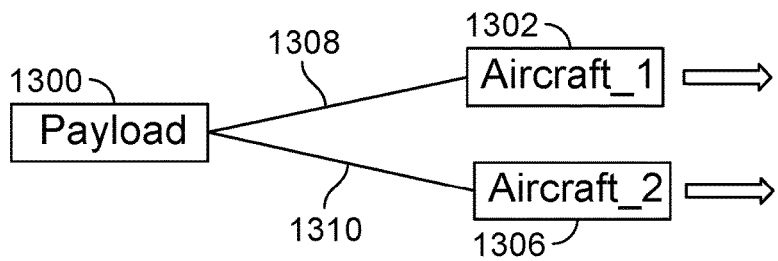
FIG. 13C is a diagram illustrating the system of FIG. 13A in a flight configuration in which the aircraft is towing the payload.

FIG. 13C is a diagram illustrating the system of FIG. 13A in a flight configuration in which the aircraft is towing the payload. In some embodiments, the flight configuration comprises the first lift aircraft and a second lift aircraft towing the powered payload behind the lift aircraft and the second lift aircraft, wherein the angle between the first lift aircraft and the second lift aircraft is determined to minimize tether drag. In some embodiments, aircraft_1 1302 and aircraft_2 1306 fly in front of payload 1300, connected via tether 1308 and tether 1310. In some embodiments, the aircraft and payload fly at similar altitudes and in the same direction. In some embodiments, the aircraft are built to be light in order to optimally lift the payload. In some embodiments, main battery power is stored in payload 1300. In some embodiments, the powered payload provides power to the lift aircraft. In some embodiments, a tether is powered. In some embodiments, the tether comprises a rope around a metallic (e.g. copper) cord, wherein a coefficient of the rope is matched to the coefficient of the metallic cord.

Figure 14:
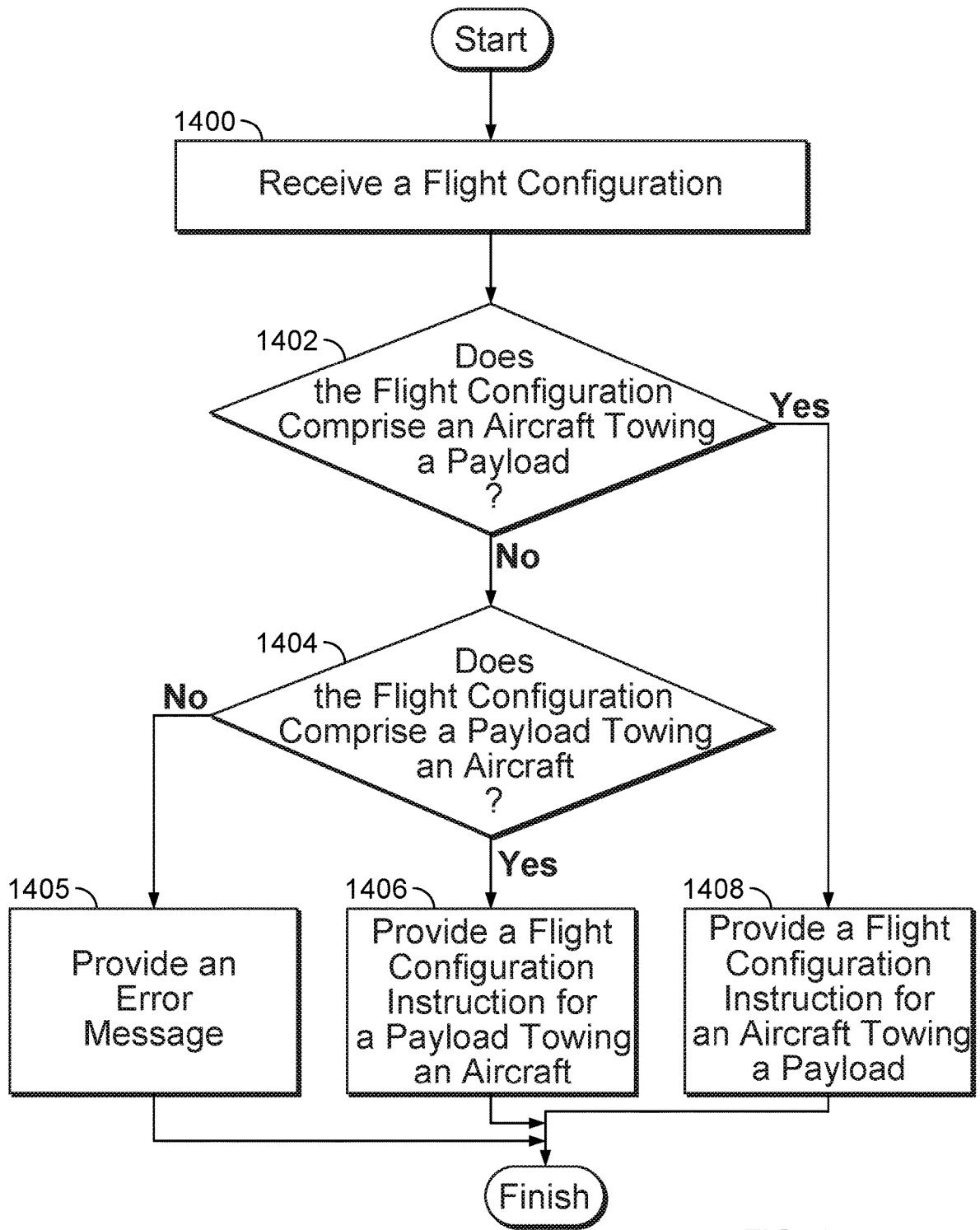
FIG. 14 is a flow diagram illustrating an embodiment of a process to transition to a forward flight configuration.

FIG. 14 is a flow diagram illustrating an embodiment of a process to transition to a forward flight configuration. In 1400, an indication to transition to a flight configuration is received. In some embodiments, a first aircraft, second aircraft, and payload are capable of executing a payload first or an aircraft first forward flight configuration. In other embodiments, not shown in FIG. 14, a given system may be configured to implement only one or the other of a payload first forward flight configuration, as in FIGS. 12A-12D and a lift aircraft first forward flight configuration, as in FIGS. 13A-13C. Referring further to FIG. 14, in 1402 it is determined whether the flight configuration to be transitioned to comprises an aircraft towing a payload. In the event that the flight configuration comprises an aircraft towing a payload, in 1408, a flight configuration instruction for an aircraft towing a payload is provided. In some embodiments, the flight configuration instruction is implemented by the instruction flow described in FIG. 16. In the event that the flight configuration does not comprise an aircraft towing a payload, in 1404 is it determined whether the flight configuration comprises a payload towing an aircraft. In the event that the flight configuration does comprise a payload towing an aircraft, in 1406 a flight configuration instruction for a payload towing an aircraft is provided. In some embodiments, the flight configuration instruction is implemented by the instruction flow described in FIG. 15. In the event that the flight configuration does not comprise a payload towing an aircraft, in 1405 an error message is provided. In some embodiments, the error message is provided based on whether the flight configuration is recognized or in the event that instructions do not exist for the flight configuration. In some embodiments, the flow is executed by a processor external to the payload and aircraft. In some embodiments, the external processor provides determines and provides instructions to the payload and aircraft. In some embodiments, a payload or aircraft comprises a processor that determines and provides flight instructions.

In some embodiments, a payload, a first aircraft, and a second aircraft is preconfigured to execute a designated forward flight configuration. In some embodiments, battery placement in the payload or aircraft is determined based on the designated forward flight configuration. In some embodiments, a tether is designed to be powered or not based on the designated forward flight configuration. In some embodiments, a payload and multiple tethered aircraft are configured to execute a designated forward flight configuration based on a signal, an altitude, a time, or any other appropriate reason.

Figure 15:
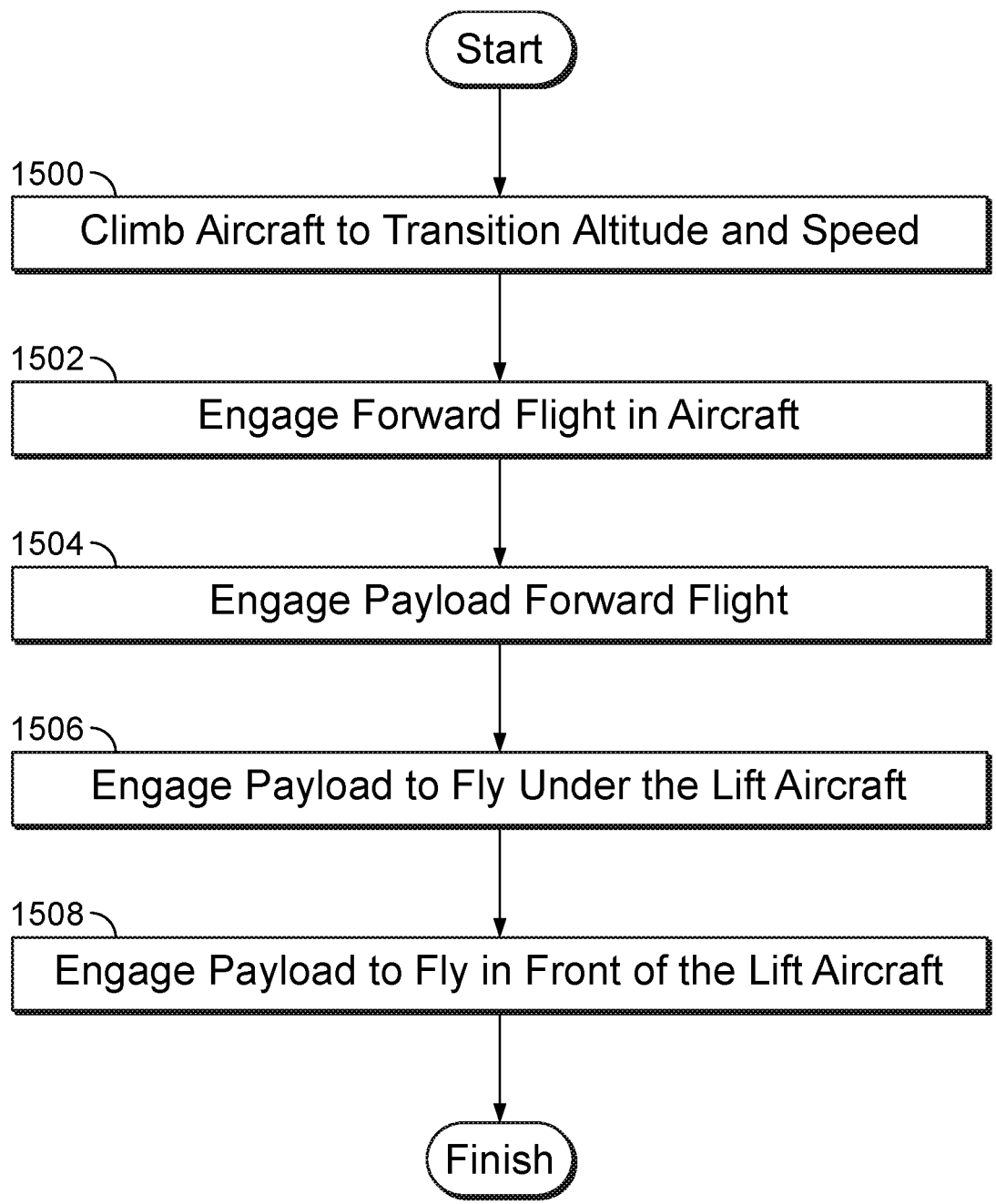
FIG. 15 is a flow diagram illustrating an embodiment of a process for a flight configuration for a payload towing an aircraft.

FIG. 15 is a flow diagram illustrating an embodiment of a process for a flight configuration for a payload towing an aircraft. In 1500, the aircraft climb to a transition altitude and speed. In 1502, forward flight is engaged in the aircraft. In some embodiments, lift aircraft phase control is disabled such that the aircraft depart from an original periodic trajectory. In 1504, payload forward flight is engaged. In 1506, the payload is engaged to fly under the aircraft. In some embodiments, the payload flies past the aircraft. In 1508, the aircraft is engaged to fly in front of the aircraft. In some embodiments, the aircraft fly behind the payload with a shallow angle between the aircraft.

Figure 16:
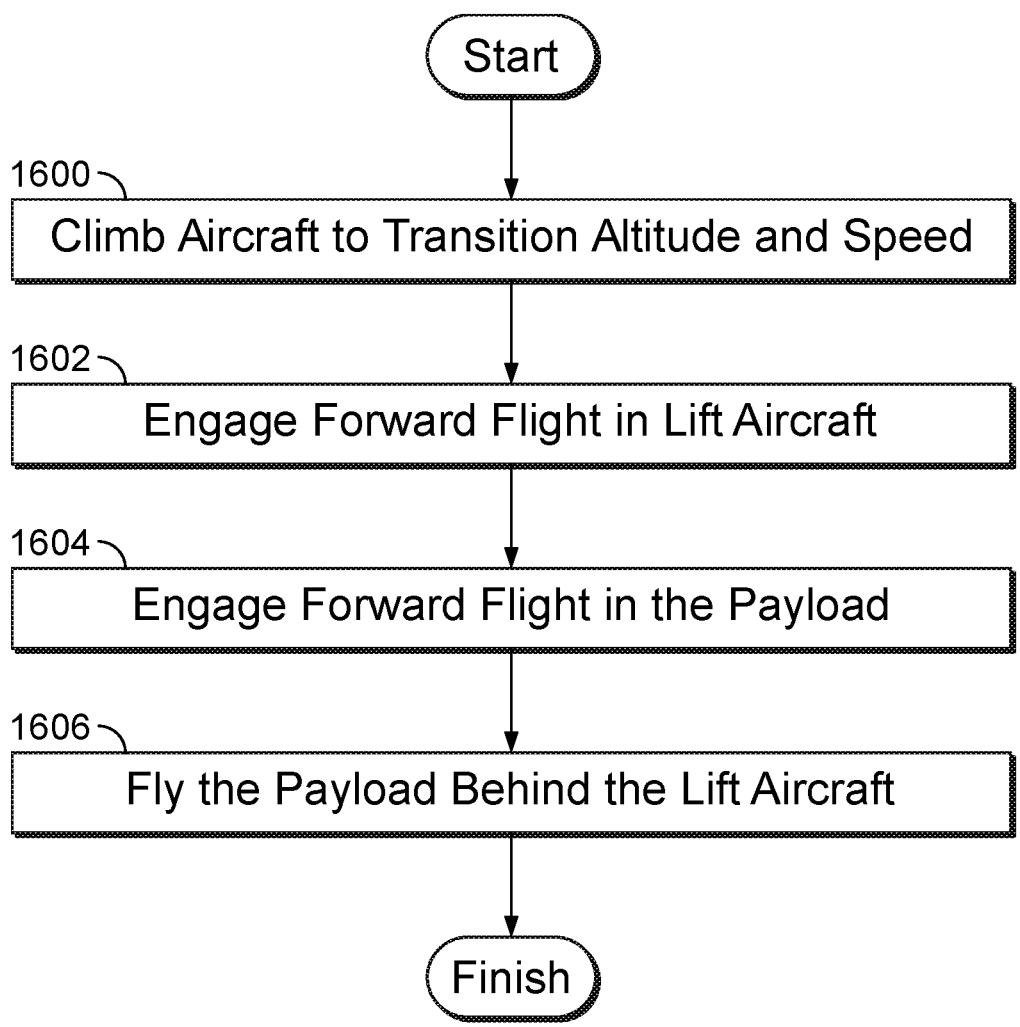
FIG. 16 is a flow diagram illustrating an embodiment of a process for a flight configuration for an aircraft towing a payload.

FIG. 16 is a flow diagram illustrating an embodiment of a process for a flight configuration for an aircraft towing a payload. In 1600, the aircraft climb to a transition altitude and speed. In 1602, forward flight is engaged in the aircraft. In 1604, payload forward flight is engaged. In 1606, the payload is flown behind the aircraft. In 1608, the aircraft are engaged to fly at a shallow angle ahead of the lift aircraft. In some embodiments, the angle is determined to minimize drag.

In some embodiments, a landing flow may be executed following a forward flight configuration. In some embodiments, the landing flow comprises the payload flying at a decreased speed or turning off power to the payload. In some embodiments, a second aircraft follows a first aircraft into flying in a continuous periodic trajectory. In some embodiments, the first aircraft and the second aircraft fly at a decline towards the ground in the continuous periodic trajectory until the payload reaches the ground.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system to adjust a load including:
an interface to receive wind information associated with a first aircraft included in a plurality of aircraft, wherein the plurality of aircraft includes a second aircraft, wherein the first aircraft and the second aircraft fly opposite from each other in an original elliptical trajectory; and
a processor configured to:
determine based at least in part on the wind information whether the first aircraft included in the plurality of aircraft tethered to a payload and flying initially in the original elliptical trajectory is flying upwind or downwind;
in the event the first aircraft is determined to be flying downwind, cause the first aircraft to fly further from a vertical axis of the payload than a corresponding distance associated with the original elliptical trajectory; and
in the event the first aircraft is determined to be flying upwind, cause the first aircraft to fly nearer to the vertical axis of the payload than a corresponding distance associated with the original elliptical trajectory, wherein:
the first aircraft and the second aircraft maintain a set phase difference between each other; and
in response to a determination that a variance in the set phase difference between the first aircraft and the second aircraft has been detected, perform one or more of the following:
adjust a trajectory of at least one of the first aircraft and the second aircraft to maintain the set phase difference;
adjust a throttle of at least one of the first aircraft and the second aircraft to maintain the set phase difference; and/or
adjust a load of at least one of the first aircraft and the second aircraft to maintain the set phase difference.

2. The system of claim 1, wherein the plurality of aircraft are in the process of lifting the payload.

3. The system of claim 1, wherein the second aircraft of the plurality of aircraft is configured to fly nearer to the vertical axis of the payload than a corresponding distance associated with the original elliptical trajectory in the event the first aircraft flies further from the vertical axis of the payload than a corresponding distance associated with the original elliptical trajectory and is configured to fly further from the vertical axis of the payload than a corresponding distance associated with the original elliptical trajectory in the event the first aircraft flies nearer to the vertical axis of the payload than a corresponding distance associated with the original elliptical trajectory.

4. The system of claim 1, wherein the second aircraft of the plurality of aircraft is configured to fly nearer to the vertical axis of the payload than a corresponding distance associated with the original elliptical trajectory in the event the second aircraft is flying upwind and is configured to fly further from the vertical axis of the payload than a corresponding distance associated with the original elliptical trajectory in the event the second aircraft is flying downwind.

5. The system of claim 1, wherein in the event the first aircraft is flying upwind or downwind, the original elliptical trajectory of the plurality of aircraft is translated.

6. The system of claim 1, wherein the first aircraft diverts from the original elliptical trajectory in the event the first aircraft is flying upwind or downwind and returns to the original elliptical trajectory in the event the first aircraft is no longer flying upwind or downwind.

7. The system of claim 1, wherein the first aircraft maintains a fixed distance from the payload.

8. The system of claim 1, wherein flying further from the vertical axis of the payload than a corresponding distance associated with the original elliptical trajectory comprises one or more of the following: decreasing a tether angle of the first aircraft or decreasing an altitude of the first aircraft.

9. The system of claim 1, wherein flying nearer to the vertical axis of the payload than a corresponding distance associated with the original elliptical trajectory comprises one or more of the following: increasing a tether angle of the first aircraft or increasing an altitude of the first aircraft.

10. The system of claim 1, wherein the first aircraft is determined to be flying upwind or downwind based on one or more of the following: a speed, a direction, an air density, an air viscosity, an air compressibility, a speed of sound, lift information, or a tether tension.

11. The system of claim 1, wherein flying the first aircraft nearer to the vertical axis of the payload than a corresponding distance associated with the original elliptical trajectory increases the load experienced by the first aircraft due to the payload and decreases the load experienced by the second aircraft of the plurality of aircraft due to the payload.

12. The system of claim 1, wherein flying the first aircraft further from the vertical axis of the payload than a corresponding distance associated with the original elliptical trajectory decreases the load experienced by the first aircraft due to the payload and increases the load experienced by the second aircraft of the plurality of aircraft due to the payload.

13. The system of claim 1, wherein a time duration or a distance the first aircraft flies nearer to or further from the vertical axis of the payload is determined based on a gain schedule.

14. The system of claim 13, wherein the gain schedule maps a wind speed to a quantitative change to an aircraft trajectory.

15. The system of claim 13, wherein the gain schedule is determined to maximize a lift capacity of the first aircraft lifting the payload.

16. The system of claim 1, wherein the first aircraft and the second aircraft are not in communications with each other.

17. The system of claim 1, wherein flying the first aircraft nearer to or further from the vertical axis of the payload than a corresponding distance associated with the original elliptical trajectory compensates for wind effects.

18. The system of claim 1, wherein in response to a determination that a variance in the set phase difference between the first aircraft and the second aircraft has been detected, perform two or more of the following:
adjust a trajectory of at least one of the first aircraft and the second aircraft to maintain the set phase difference;
adjust a throttle of at least one of the first aircraft and the second aircraft to maintain the set phase difference; and/or
adjust a load of at least one of the first aircraft and the second aircraft to maintain the set phase difference.

19. The system of claim 1, wherein in response to a determination that a variance in the set phase difference between the first aircraft and the second aircraft has been detected, perform the following:
adjust a trajectory of at least one of the first aircraft and the second aircraft to maintain the set phase difference;

adjust a throttle of at least one of the first aircraft and the second aircraft to maintain the set phase difference; and adjust a load of at least one of the first aircraft and the second aircraft to maintain the set phase difference.

20. A method for adjusting a load on a tethered aircraft, comprising:

receiving wind information associated with a first aircraft included in a plurality of aircraft, wherein the plurality of aircraft includes a second aircraft, wherein the first aircraft and the second aircraft fly opposite from each other in an original elliptical trajectory;

determining based at least in part on the wind information whether the first aircraft included in the plurality of aircraft tethered to a payload and flying initially in the original elliptical trajectory is flying upwind or downwind;

in the event the first aircraft is determined to be flying downwind, causing the first aircraft to fly further from a vertical axis of the payload than a corresponding distance associated with the original elliptical trajectory; and in the event the first aircraft is determined to be flying upwind, causing the first aircraft to fly nearer to the vertical axis of the payload than a corresponding distance associated with the original elliptical trajectory, wherein:

the first aircraft and the second aircraft maintain a set phase difference between each other; and in response to a determination that a variance in the set phase difference between the first aircraft and the second aircraft has been detected, perform one or more of the following:

adjusting a trajectory of at least one of the first aircraft and the second aircraft to maintain the set phase difference;

adjusting a throttle of at least one of the first aircraft and the second aircraft to maintain the set phase difference; and/or adjusting a load of at least one of the first aircraft and the second aircraft to maintain the set phase difference.

21. A non-transitory computer readable storage medium comprising computer instructions for:

receiving wind information associated with a first aircraft included in a plurality of aircraft, wherein the plurality of aircraft includes a second aircraft, wherein the first aircraft and the second aircraft fly opposite from each other in an original elliptical trajectory;

determining based at least in part on the wind information whether the first aircraft included in the plurality of aircraft tethered to a payload and flying initially in the original elliptical trajectory is flying upwind or downwind;

in the event the first aircraft is determined to be flying downwind, causing the first aircraft to fly further from a vertical axis of the payload than a corresponding distance associated with the original elliptical trajectory; and in the event the first aircraft is determined to be flying upwind, causing the first aircraft to fly nearer to the vertical axis of the payload than a corresponding distance associated with the original elliptical trajectory, wherein:

the first aircraft and the second aircraft maintain a set phase difference between each other; and in response to a determination that a variance in the set phase difference between the first aircraft and the second aircraft has been detected, perform one or more of the following:

adjusting a trajectory of at least one of the first aircraft and the second aircraft to maintain the set phase difference;

adjusting a throttle of at least one of the first aircraft and the second aircraft to maintain the set phase difference; and/or adjusting a load of at least one of the first aircraft and the second aircraft to maintain the set phase difference.

* * * * *

UNITED STATES PATENT AND TRADEMARK OFFICE
CERTIFICATE OF CORRECTION

| | |
|---|---|
| PATENT NO. | : 11,442,474 B2 |
| APPLICATION NO. | : 16/913250 |
| DATED | : September 13, 2022 |
| INVENTOR(S) | : Damon Vander Lind and Gregory Mainland Horn |

It is certified that error appears in the above-identified patent and that said Letters Patent is hereby corrected as shown below:

In the Specification

In Column 4, Line(s) 45, delete "zygbee" and insert --Zigbee--, therefor.

Signed and Sealed this
Thirtieth Day of May, 2023

Katherine Kelly Vidal
*Director of the United States Patent and Trademark Office*